United States Patent
Chu

(10) Patent No.: US 8,352,673 B2
(45) Date of Patent: Jan. 8, 2013

(54) DATA WRITING METHOD FOR A FLASH MEMORY, AND FLASH MEMORY CONTROLLER AND FLASH MEMORY STORAGE SYSTEM USING THE SAME

(75) Inventor: Chien-Hua Chu, Hsinchu County (TW)

(73) Assignee: Phison Electronics Corp., Miaoli (TW)

( * ) Notice: Subject to any disclaimer, the term of this patent is extended or adjusted under 35 U.S.C. 154(b) by 510 days.

(21) Appl. No.: 12/641,051

(22) Filed: Dec. 17, 2009

(65) Prior Publication Data

US 2011/0107015 A1 May 5, 2011

(30) Foreign Application Priority Data

Oct. 30, 2009 (TW) ................................ 98136907 A

(51) Int. Cl.
*G06F 12/00* (2006.01)

(52) U.S. Cl. .................... 711/103; 365/185.33; 711/115
(58) Field of Classification Search .................. 711/103; 365/185.33
See application file for complete search history.

(56) References Cited

U.S. PATENT DOCUMENTS

| | | | | |
|---|---|---|---|---|
| 5,737,742 A | * | 4/1998 | Achiwa et al. | 711/103 |
| 2007/0245069 A1 | * | 10/2007 | Kikuchi | 711/103 |
| 2008/0005530 A1 | * | 1/2008 | Nakano | 711/207 |
| 2008/0270680 A1 | * | 10/2008 | Chang | 711/103 |
| 2009/0070520 A1 | * | 3/2009 | Mizushima | 711/103 |

FOREIGN PATENT DOCUMENTS

CN 101556555 A 10/2009

* cited by examiner

*Primary Examiner* — Hashem Farrokh
(74) *Attorney, Agent, or Firm* — J.C. Patents

(57) ABSTRACT

A data writing method for writing data from a host system into a flash memory chip having a plurality of physical blocks is provided. The method includes configuring a plurality of logical access addresses and recording address centers and address radiuses for the physical blocks. The method also includes receiving data to be written in logical access addresses, determining opened physical blocks among the physical blocks, and writing the data into the flash memory chip based on the logical access addresses, and the address centers and the address radiuses of the opened physical blocks. Accordingly, the method can effectively reduce the degree of data dispersion of each of the physical blocks, reduce the time for organizing valid data, and increase the speed for writing data.

21 Claims, 19 Drawing Sheets

| Logical page index | Physical page address |
|---|---|
| LPA(0) | PPA(0) |
| LPA(1) | PPA(1) |
| LPA(2) | PPA(2) |
| LPA(3) | PPA(3) |
| LPA(4) | PPA(4) |
| ⋮ | ⋮ |
| LPA(127) | PPA(127) |
| LPA(128) | PPA(128) |
| LPA(129) | PPA(129) |
| LPA(130) | PPA(130) |
| LPA(131) | PPA(131) |
| ⋮ | ⋮ |
| LPA(L) | PPA(L) |

FIG. 4A

| Physical page index | Logical page address |
|---|---|
| PPA(0) | LPA(0) |
| PPA(1) | LPA(1) |
| PPA(2) | LPA(2) |
| PPA(3) | LPA(3) |
| PPA(4) | LPA(4) |
| ⋮ | ⋮ |
| PPA(127) | LPA(127) |
| PPA(128) | LPA(128) |
| PPA(129) | LPA(129) |
| PPA(130) | LPA(130) |
| PPA(131) | LPA(131) |
| ⋮ | ⋮ |
| PPA(L) | LPA(L) |
| PPA(L+1) | NULL |
| PPA(L+2) | NULL |
| PPA(L+3) | NULL |
| ⋮ | ⋮ |
| PPA(L+128) | NULL |
| PPA(L+129) | NULL |
| PPA(L+130) | NULL |
| PPA(L+131) | NULL |
| ⋮ | ⋮ |
| PPA(K) | NULL |

FIG. 4B

| Logical page index | Physical page address |
|---|---|
| LPA(0) | PPA(0) |
| LPA(1) | PPA(L+1) |
| LPA(2) | PPA(2) |
| LPA(3) | PPA(3) |
| LPA(4) | PPA(4) |
| ⋮ | ⋮ |
| LPA(127) | PPA(127) |
| LPA(128) | PPA(128) |
| LPA(129) | PPA(129) |
| LPA(130) | PPA(130) |
| LPA(131) | PPA(131) |
| ⋮ | ⋮ |
| LPA(L) | PPA(L) |

| Physical page index | Logical page address |
|---|---|
| PPA(0) | LPA(0) |
| PPA(1) | LPA(1) |
| PPA(2) | LPA(2) |
| PPA(3) | LPA(3) |
| PPA(4) | LPA(4) |
| ⋮ | ⋮ |
| PPA(127) | LPA(127) |
| PPA(128) | LPA(128) |
| PPA(129) | LPA(129) |
| PPA(130) | LPA(130) |
| PPA(131) | LPA(131) |
| ⋮ | ⋮ |
| PPA(L) | LPA(L) |
| PPA(L+1) | LPA(1) |
| PPA(L+2) | NULL |
| PPA(L+3) | NULL |
| ⋮ | ⋮ |
| PPA(L+128) | NULL |
| PPA(L+129) | NULL |
| PPA(L+130) | NULL |
| PPA(L+131) | NULL |
| ⋮ | ⋮ |
| PPA(K) | NULL |

| Logical page index | Physical page address |
|---|---|
| LPA(0) | PPA(0) |
| LPA(1) | PPA(L+1) |
| LPA(2) | PPA(2) |
| LPA(3) | PPA(L+2) |
| LPA(4) | PPA(4) |
| ⋮ | ⋮ |
| LPA(127) | PPA(127) |
| LPA(128) | PPA(128) |
| LPA(129) | PPA(129) |
| LPA(130) | PPA(130) |
| LPA(131) | PPA(131) |
| ⋮ | ⋮ |
| LPA(L) | PPA(L) |

| Physical page index | Logical page address |
|---|---|
| PPA(0) | LPA(0) |
| PPA(1) | LPA(1) |
| PPA(2) | LPA(2) |
| PPA(3) | LPA(3) |
| PPA(4) | LPA(4) |
| ⋮ | ⋮ |
| PPA(127) | LPA(127) |
| PPA(128) | LPA(128) |
| PPA(129) | LPA(129) |
| PPA(130) | LPA(130) |
| PPA(131) | LPA(131) |
| ⋮ | ⋮ |
| PPA(L) | LPA(L) |
| PPA(L+1) | LPA(1) |
| PPA(L+2) | LPA(3) |
| PPA(L+3) | NULL |
| ⋮ | ⋮ |
| PPA(L+128) | NULL |
| PPA(L+129) | NULL |
| PPA(L+130) | NULL |
| PPA(L+131) | NULL |
| ⋮ | ⋮ |
| PPA(K) | NULL |

| Logical page index | Physical page address |
|---|---|
| LPA(0) | PPA(0) |
| LPA(1) | PPA(L+1) |
| LPA(2) | PPA(2) |
| LPA(3) | PPA(L+2) |
| LPA(4) | PPA(4) |
| ⋮ | ⋮ |
| LPA(127) | PPA(127) |
| LPA(128) | PPA(128) |
| LPA(129) | PPA(L+129) |
| LPA(130) | PPA(130) |
| LPA(131) | PPA(131) |
| ⋮ | ⋮ |
| LPA(L) | PPA(L) |

| Physical page index | Logical page address |
|---|---|
| PPA(0) | LPA(0) |
| PPA(1) | LPA(1) |
| PPA(2) | LPA(2) |
| PPA(3) | LPA(3) |
| PPA(4) | LPA(4) |
| ⋮ | ⋮ |
| PPA(127) | LPA(127) |
| PPA(128) | LPA(128) |
| PPA(129) | LPA(129) |
| PPA(130) | LPA(130) |
| PPA(131) | LPA(131) |
| ⋮ | ⋮ |
| PPA(L) | LPA(L) |
| PPA(L+1) | LPA(1) |
| PPA(L+2) | LPA(3) |
| PPA(L+3) | NULL |
| ⋮ | ⋮ |
| PPA(L+128) | NULL |
| PPA(L+129) | LPA(129) |
| PPA(L+130) | NULL |
| PPA(L+131) | NULL |
| ⋮ | ⋮ |
| PPA(K) | NULL |

| Logical page index | Physical page address |
|---|---|
| LPA(0) | PPA(0) |
| LPA(1) | PPA(L+1) |
| LPA(2) | PPA(2) |
| LPA(3) | PPA(L+2) |
| LPA(4) | PPA(4) |
| ⋮ | ⋮ |
| LPA(20) | PPA(20) |
| LPA(21) | PPA(L+3) |
| LPA(22) | PPA(22) |
| ⋮ | ⋮ |
| LPA(127) | PPA(127) |
| LPA(128) | PPA(128) |
| LPA(129) | PPA(L+129) |
| LPA(130) | PPA(130) |
| LPA(131) | PPA(131) |
| ⋮ | ⋮ |
| LPA(L) | PPA(L) |

| Physical page index | Logical page address |
|---|---|
| PPA(0) | LPA(0) |
| PPA(1) | LPA(1) |
| PPA(2) | LPA(2) |
| PPA(3) | LPA(3) |
| PPA(4) | LPA(4) |
| ⋮ | ⋮ |
| PPA(20) | LPA(20) |
| PPA(21) | LPA(21) |
| PPA(22) | LPA(22) |
| ⋮ | ⋮ |
| PPA(127) | LPA(127) |
| PPA(128) | LPA(128) |
| PPA(129) | LPA(129) |
| PPA(130) | LPA(130) |
| PPA(131) | LPA(131) |
| ⋮ | ⋮ |
| PPA(L) | LPA(L) |
| PPA(L+1) | LPA(1) |
| PPA(L+2) | LPA(3) |
| PPA(L+3) | LPA(21) |
| PPA(L+4) | NULL |
| ⋮ | ⋮ |
| PPA(L+128) | NULL |
| PPA(L+129) | LPA(129) |
| PPA(L+130) | NULL |
| PPA(L+131) | NULL |
| ⋮ | ⋮ |
| PPA(K) | NULL |

| Logical page index | Physical page address |
|---|---|
| LPA(0) | PPA(L+1) |
| LPA(1) | PPA(L+2) |
| LPA(2) | PPA(L+3) |
| LPA(3) | PPA(L+4) |
| LPA(4) | PPA(4) |
| ⋮ | ⋮ |
| LPA(127) | PPA(127) |
| LPA(128) | PPA(128) |
| LPA(129) | PPA(129) |
| LPA(130) | PPA(130) |
| LPA(131) | PPA(131) |
| ⋮ | ⋮ |
| LPA(L) | PPA(L) |

| Physical page index | Logical page address |
|---|---|
| PPA(0) | LPA(0) |
| PPA(1) | LPA(1) |
| PPA(2) | LPA(2) |
| PPA(3) | LPA(3) |
| PPA(4) | LPA(4) |
| ⋮ | ⋮ |
| PPA(127) | LPA(127) |
| PPA(128) | LPA(128) |
| PPA(129) | LPA(129) |
| PPA(130) | LPA(130) |
| PPA(131) | LPA(131) |
| ⋮ | ⋮ |
| PPA(L) | LPA(L) |
| PPA(L+1) | LPA(0) |
| PPA(L+2) | LPA(1) |
| PPA(L+3) | LPA(2) |
| PPA(L+4) | LPA(3) |
| PPA(L+5) | NULL |
| ⋮ | ⋮ |
| PPA(L+128) | NULL |
| PPA(L+129) | NULL |
| PPA(L+130) | NULL |
| PPA(L+131) | NULL |
| ⋮ | ⋮ |
| PPA(K) | NULL |

FIG. 12B

| Logical page index | Physical page address |
|---|---|
| LPA(0) | PPA(L+1) |
| LPA(1) | PPA(L+2) |
| LPA(2) | PPA(L+3) |
| LPA(3) | PPA(L+4) |
| LPA(4) | PPA(4) |
| ⋮ | ⋮ |
| LPA(127) | PPA(127) |
| LPA(128) | PPA(L+129) |
| LPA(129) | PPA(L+130) |
| LPA(130) | PPA(L+131) |
| LPA(131) | PPA(L+132) |
| LPA(132) | PPA(132) |
| ⋮ | ⋮ |
| LPA(L) | PPA(L) |

FIG. 13A

| Physical page index | Logical page address |
|---|---|
| PPA(0) | LPA(0) |
| PPA(1) | LPA(1) |
| PPA(2) | LPA(2) |
| PPA(3) | LPA(3) |
| PPA(4) | LPA(4) |
| ⋮ | ⋮ |
| PPA(127) | LPA(127) |
| PPA(128) | LPA(128) |
| PPA(129) | LPA(129) |
| PPA(130) | LPA(130) |
| PPA(131) | LPA(131) |
| ⋮ | ⋮ |
| PPA(L) | LPA(L) |
| PPA(L+1) | LPA(0) |
| PPA(L+2) | LPA(1) |
| PPA(L+3) | LPA(2) |
| PPA(L+4) | LPA(3) |
| PPA(L+5) | NULL |
| ⋮ | ⋮ |
| PPA(L+128) | NULL |
| PPA(L+129) | LPA(128) |
| PPA(L+130) | LPA(129) |
| PPA(L+131) | LPA(130) |
| PPA(L+132) | LPA(131) |
| PPA(L+133) | NULL |
| ⋮ | ⋮ |
| PPA(K) | NULL |

FIG. 13B

| Logical page index | Physical page address |
|---|---|
| LPA(0) | PPA(L+1) |
| LPA(1) | PPA(L+2) |
| LPA(2) | PPA(L+3) |
| LPA(3) | PPA(L+4) |
| LPA(4) | PPA(4) |
| ⋮ | ⋮ |
| LPA(19) | PPA(19) |
| LPA(20) | PPA(L+5) |
| LPA(21) | PPA(L+6) |
| LPA(22) | PPA(L+7) |
| LPA(23) | PPA(L+8) |
| LPA(24) | PPA(24) |
| ⋮ | ⋮ |
| LPA(127) | PPA(127) |
| LPA(128) | PPA(L+129) |
| LPA(129) | PPA(L+130) |
| LPA(130) | PPA(L+131) |
| LPA(131) | PPA(L+132) |
| LPA(132) | PPA(132) |
| ⋮ | ⋮ |
| LPA(L) | PPA(L) |

| Physical page index | Logical page address |
|---|---|
| PPA(0) | LPA(0) |
| PPA(1) | LPA(1) |
| PPA(2) | LPA(2) |
| PPA(3) | LPA(3) |
| PPA(4) | LPA(4) |
| ⋮ | ⋮ |
| PPA(19) | LPA(19) |
| PPA(20) | LPA(20) |
| PPA(21) | LPA(21) |
| PPA(22) | LPA(22) |
| PPA(23) | LPA(23) |
| PPA(24) | LPA(24) |
| ⋮ | ⋮ |
| PPA(127) | LPA(127) |
| PPA(128) | LPA(128) |
| PPA(129) | LPA(129) |
| PPA(130) | LPA(130) |
| PPA(131) | LPA(131) |
| ⋮ | ⋮ |
| PPA(L) | LPA(L) |
| PPA(L+1) | LPA(0) |
| PPA(L+2) | LPA(1) |
| PPA(L+3) | LPA(2) |
| PPA(L+4) | LPA(3) |
| PPA(L+5) | LPA(20) |
| PPA(L+6) | LPA(21) |
| PPA(L+7) | LPA(22) |
| PPA(L+8) | LBA(23) |
| PPA(L+9) | NULL |
| ⋮ | ⋮ |
| PPA(L+127) | NULL |
| PPA(L+128) | NULL |
| PPA(L+129) | LPA(128) |
| PPA(L+130) | LPA(129) |
| PPA(L+131) | LPA(130) |
| PPA(L+132) | LPA(131) |
| PPA(L+132) | NULL |
| ⋮ | ⋮ |
| PPA(K) | NULL |

DATA WRITING METHOD FOR A FLASH MEMORY, AND FLASH MEMORY CONTROLLER AND FLASH MEMORY STORAGE SYSTEM USING THE SAME

CROSS-REFERENCE TO RELATED APPLICATION

This application claims the priority benefit of Taiwan application serial no. 98136907, filed on Oct. 30, 2009. The entirety of the above-mentioned patent application is hereby incorporated by reference herein and made a part of this specification.

BACKGROUND OF THE INVENTION

1. Field of the Invention

The present invention relates to a data writing method for a flash memory and particularly to a data writing method capable of effectively writing data into a flash memory, and a flash memory controller and a flash memory storage system using the method.

2. Description of Related Art

Flash memory is the most adaptable memories to be applied in portable electronic products which are supplied power by batteries due to its data non-volatility, low power consumption, small volume, and non-mechanical structure. For example, a solid state drive (SSD) is a storage device that uses a NAND flash memory as its storage medium, and which has been broadly used in notebook computers as the main storage device.

In general, the flash memory chip of a flash memory storage device has a plurality of physical blocks, each physical block has a plurality of physical pages, and each physical block is the erasing unit and each physical page is the programming unit. When the memory cells of the flash memory chip is programmed, the programming only is performed in one-way (i.e., a value of each memory cell only be programmed from '1' to '0'). Therefore, the programmed physical page (i.e., the physical page had been used for storing data) must be erased first and then programmed, but not be programmed directly. In particular, the flash memory must be erased in unit of each physical block. Therefore, when an erasing operation is performed for a physical page had been used for storing data, entire physical block that the physical page belongs to must be erased. In view of the characteristic of the flash memory mentioned above (i.e., each physical block is the erasing unit and each physical page is the programming unit), the physical blocks of the flash memory chip are logically grouped into a data area and a spare area in the flash memory storage device. The physical blocks in the data area are physical blocks which have been used for storing data, and the physical blocks in the spare area are physical blocks which have not been used for storing data. When a host system is about to store data in the flash memory storage device, a control circuit of the flash memory storage device gets a physical block from the spare area to write data, and the gotten physical block is associated to the data area. And, when the physical block in the data area is erased, the erased physical block is associated to the spare area.

Additionally, the host system writes data based on logical addresses, but usually not according to the order of the logical addresses. Therefore, the data written by the host system may be stored dispersedly in a plurality of physical blocks.

Accordingly, when the control circuit of the flash memory storage device is about to erase a physical block, the flash memory storage device will spend a lot of time to organize valid data and invalid data in the entire physical block, and therefore the speed of writing data of the flash memory storage device does not increased effectively.

Therefore, how to increase the speed of writing data in a flash memory is one of the major subjects in the industry.

Nothing herein should be construed as an admission of knowledge in the prior art of any portion of the present invention. Furthermore, citation or identification of any document in this application is not an admission that such document is available as prior art to the present invention, or that any reference forms a part of the common general knowledge in the art.

SUMMARY OF THE INVENTION

The present invention is directed to a data writing method capable of effectively reducing the degree of data dispersion in each physical block, shortening the time for organizing valid data and invalid data, and increasing the speed for writing data into a flash memory.

The present invention is directed to a flash memory controller capable of effectively reducing the degree of data dispersion in each physical block, shortening the time for organizing valid data and invalid data, and increasing the speed for writing data into a flash memory.

The present invention is directed to a flash memory storage device capable of effectively reducing the degree of data dispersion in each physical block, shortening the time for organizing valid data and invalid data, and increasing the speed for writing data into a flash memory.

According to an exemplary embodiment of the present invention, a data writing method for writing data from a host system into a flash memory chip is provided, wherein the flash memory chip includes a plurality of physical blocks. The data writing method includes configuring a plurality of logical access addresses and receiving write-in data from the host system, wherein the write-in data is written into at least one logical access address. The data writing method also includes determining whether there is at least one opened physical block. And, the data writing method further also includes, when there is no any opened physical block among the physical blocks, getting a physical block from the physical blocks, writing the write-in data into the gotten physical block and setting one of the logical access addresses to be an address center of the gotten physical block.

According to an exemplary embodiment of the present invention, a flash memory controller for writing data from a host system into a flash memory chip is provided, wherein the flash memory chip includes a plurality of physical blocks. The flash memory controller includes a microprocessor unit, a flash memory interface unit, a host interface unit, and a memory management unit. The flash memory interface unit is coupled to the microprocessor unit for coupling to the flash memory chip. The host interface unit is coupled to the microprocessor unit and configured for coupling to the host system. The memory management unit is coupled to the microprocessor unit and configured to configuring a plurality of logical access addresses. Additionally, the host interface unit receives write-in data from the host system, wherein the write-in data is written into at least one logical access address. And, the memory management unit determines whether there is at least one opened physical block. Furthermore, when there is no any opened physical block among the physical blocks, the memory management unit gets a physical block from the physical blocks, writes the write-in data into the gotten physical block and sets one of the logical access addresses to be an address center of the gotten physical block.

According to an exemplary embodiment of the present invention, a flash memory storage system including a flash memory chip, a connector, and a flash memory controller is provided. The flash memory chip has a plurality of physical blocks. The connector is configured to couple to a host system. The flash memory controller is coupled to the flash memory chip and the connector, and configures a plurality of logical access addresses. Additionally, the flash memory controller receives write-in data from the host system, wherein the write-in data is written into at least one logical access address. And, the flash memory controller determines whether there is at least one opened physical block. Furthermore, when there is no any opened physical block among the physical blocks, the flash memory controller gets a physical block from the physical blocks, writes the write-in data into the gotten physical block and sets one of the logical access addresses to be an address center of the gotten physical block.

As described above, the exemplary embodiment of the present invention can effectively increasing the speed for writing data into a flash memory.

It should be understood, however, that this Summary may not contain all of the aspects and embodiments of the present invention, is not meant to be limiting or restrictive in any manner, and that the invention as disclosed herein is and will be understood by those of ordinary skill in the art to encompass obvious improvements and modifications thereto.

In order to make the aforementioned and other features and advantages of the invention more comprehensible, embodiments accompanying figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 4A and FIG. 4B are diagrams illustrating a logical page-physical page mapping table and a physical page-logical page mapping table according to an example of the first exemplary embodiment of the present invention.

FIG. 5A and FIG. 5B are diagrams illustrating a logical page-physical page mapping table and a physical page-logical page mapping table corresponding to an example of writing data according to the first exemplary embodiment of the present invention.

FIG. 6A and FIG. 6B are diagrams illustrating a logical page-physical page mapping table and a physical page-logical page mapping table corresponding to another example of writing data according to the first exemplary embodiment of the present invention.

FIG. 7A and FIG. 7B are diagrams illustrating a logical page-physical page mapping table and a physical page-logical page mapping table corresponding to another example of writing data according to the first exemplary embodiment of the present invention.

FIG. 8A and FIG. 8B are diagrams illustrating a logical page-physical page mapping table and a physical page-logical page mapping table corresponding to another example of writing data according to the first exemplary embodiment of the present invention.

FIG. 12A and FIG. 12B are diagrams illustrating a logical page-physical page mapping table and a physical page-logical page mapping table corresponding to an example of writing data according to the second exemplary embodiment of the present invention.

FIG. 13A and FIG. 13B are diagrams illustrating a logical page-physical page mapping table and a physical page-logical page mapping table corresponding to another example of writing data according to the second exemplary embodiment of the present invention.

FIG. 14A and FIG. 14B are diagrams illustrating a logical page-physical page mapping table and a physical page-logical page mapping table corresponding to another example of writing data according to the second exemplary embodiment of the present invention.

DESCRIPTION OF EMBODIMENTS

Figure 1A:
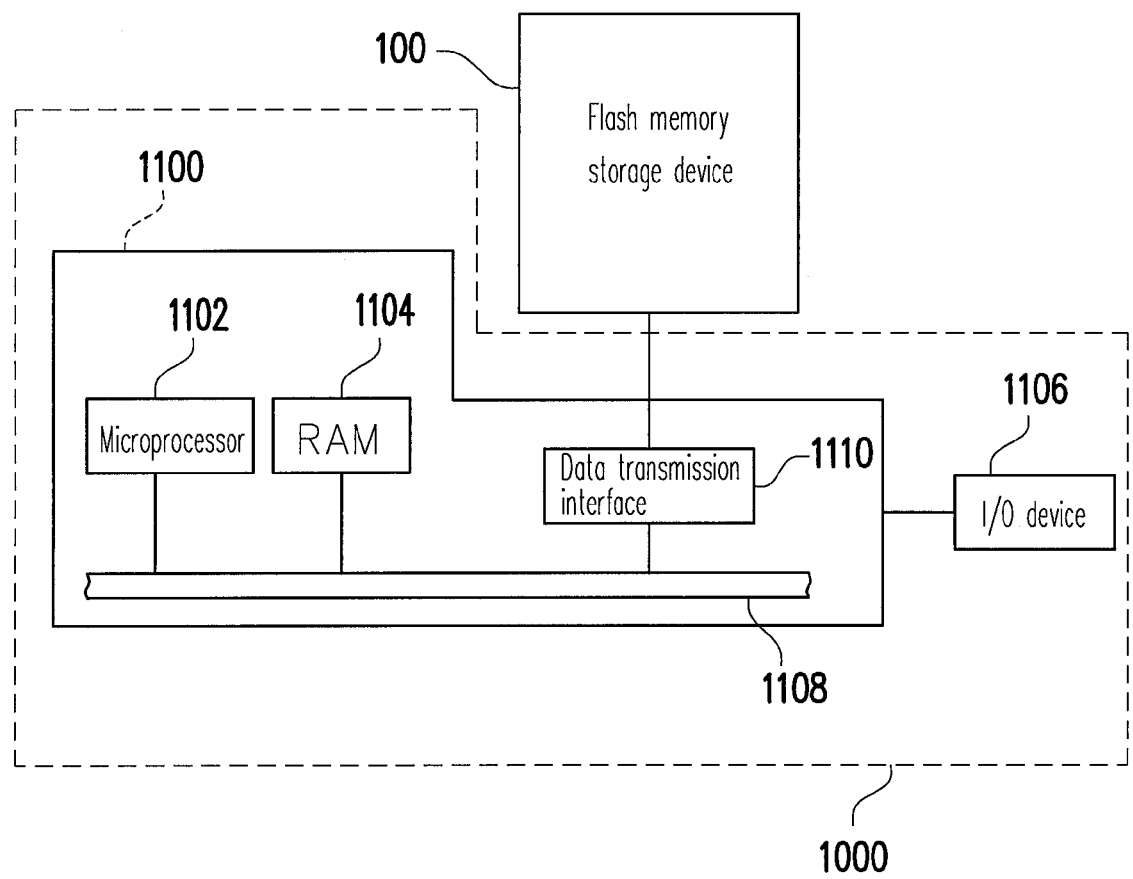
FIG. 1A is a schematic block diagram of a host system using a flash memory storage device according to a first exemplary embodiment of the present invention.

Reference will now be made in detail to the present preferred embodiments of the invention, examples of which are illustrated in the accompanying drawings. Wherever possible, the same reference numbers are used in the drawings and the description to refer to the same or like parts.

Embodiments of the present invention may comprise any one or more of the novel features described herein, including in the Detailed Description, and/or shown in the drawings. As used herein, "at least one", "one or more", and "and/or" are open-ended expressions that are both conjunctive and disjunctive in operation. For example, each of the expressions "at least on of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

It is to be noted that the term "a" or "an" entity refers to one or more of that entity. As such, the terms "a" (or "an"), "one or more" and "at least one" can be used interchangeably herein.

A flash memory storage device generally includes a flash memory chip and a controller (also referred to as a control circuit). The flash memory storage device is usually used together with a host system so that the host system can write data into or read data from the flash memory storage device. In addition, a flash memory storage device also includes an embedded flash memory and software that can be executed by a host system and substantially served as a controller of the embedded flash memory.

First Exemplary Embodiment

FIG. 1A is a schematic diagram of a host system using a flash memory storage device according to a first exemplary embodiment of the invention.

Figure 1B:
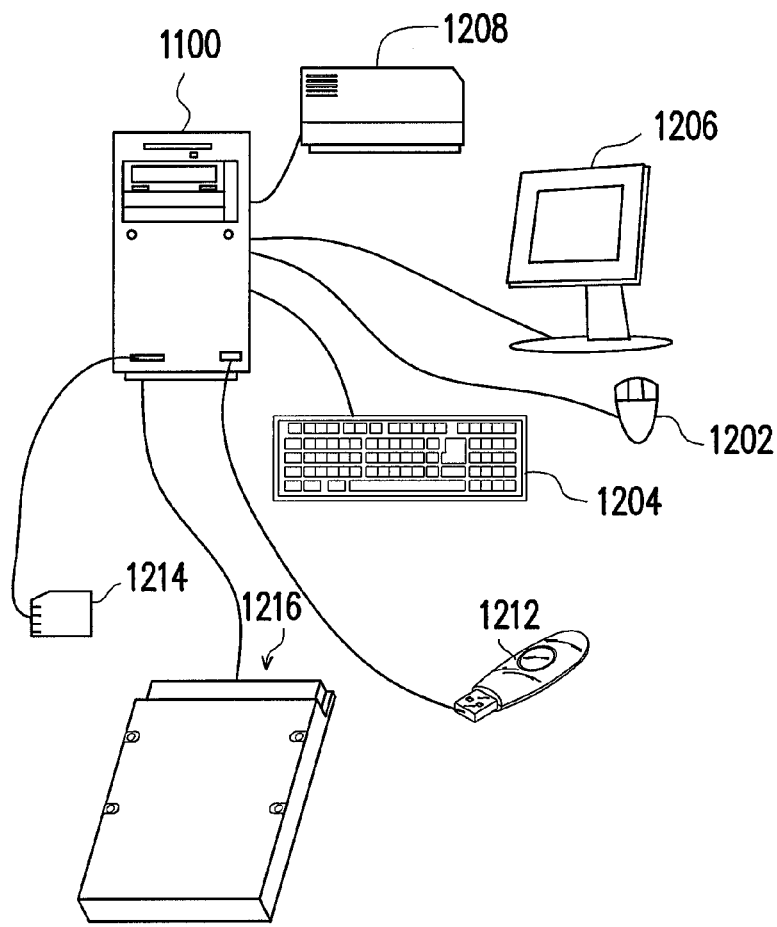
FIG. 1B illustrates a diagram of a computer, an input/output (I/O) device, and a flash memory storage device according to an exemplary embodiment of the invention.

Referring to FIG. 1A, a host system 1000 includes a computer 1100 and an input/output (I/O) device 1106. The computer 1100 includes a microprocessor 1102, a random access memory (RAM) 1104, a system bus 1108, and a data transmission interface 1110. The I/O device 1106 includes a mouse 1202, a keyboard 1204, a display 1206, and a printer 1208, as shown in FIG. 1B. It should be understood that the devices illustrated in FIG. 1B are not intended to limit the scope of the I/O device 1106, and the I/O device 1106 may further include other devices.

In the present embodiment, a flash memory storage device 100 is coupled to other devices of the host system 1000 through the data transmission interface 1110. The host system 1000 may write data into or read data from the flash memory storage device 100 through the CPU 1102, the RAM 1104, and the I/O device 1106. The flash memory storage device 100 may be a flash drive 1212, a memory card 1214, or a solid state drive (SSD) 1216, as shown in FIG. 1B.

Figure 1C:
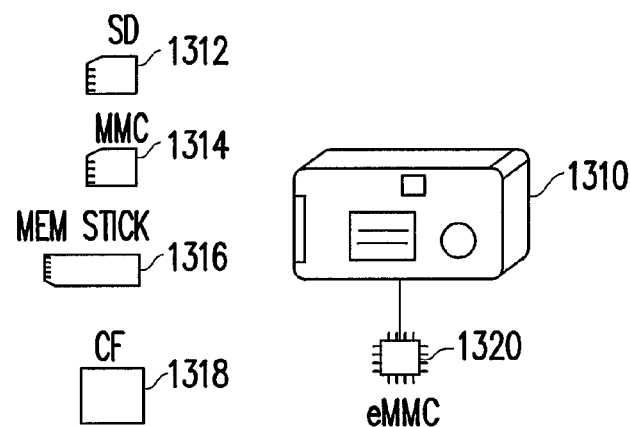
FIG. 1C illustrates a diagram of a host system and a flash memory storage device according to another exemplary embodiment of the invention.

Generally speaking, the host system 1000 may be any system that can store data. Even though the host system 1000 is described as a computer system in the present exemplary embodiment, in another exemplary embodiment of the invention, the host system 1000 may also be a digital camera, a video camera, a communication device, an audio player, or a video player, and etc. For example, if the host system 1000 is a digital camera 1310, the flash memory storage device 100 is then a SD card 1312, a MMC card 1314, a memory stick 1316, a CF card 1318, or an embedded storage device 1320 used in the digital camera 1310 (as shown in FIG. 1C) The embedded storage device 1320 includes an embedded MMC (eMMC). It should be mentioned that the eMMC is directly coupled to a substrate of the host system 1000.

Figure 1D:
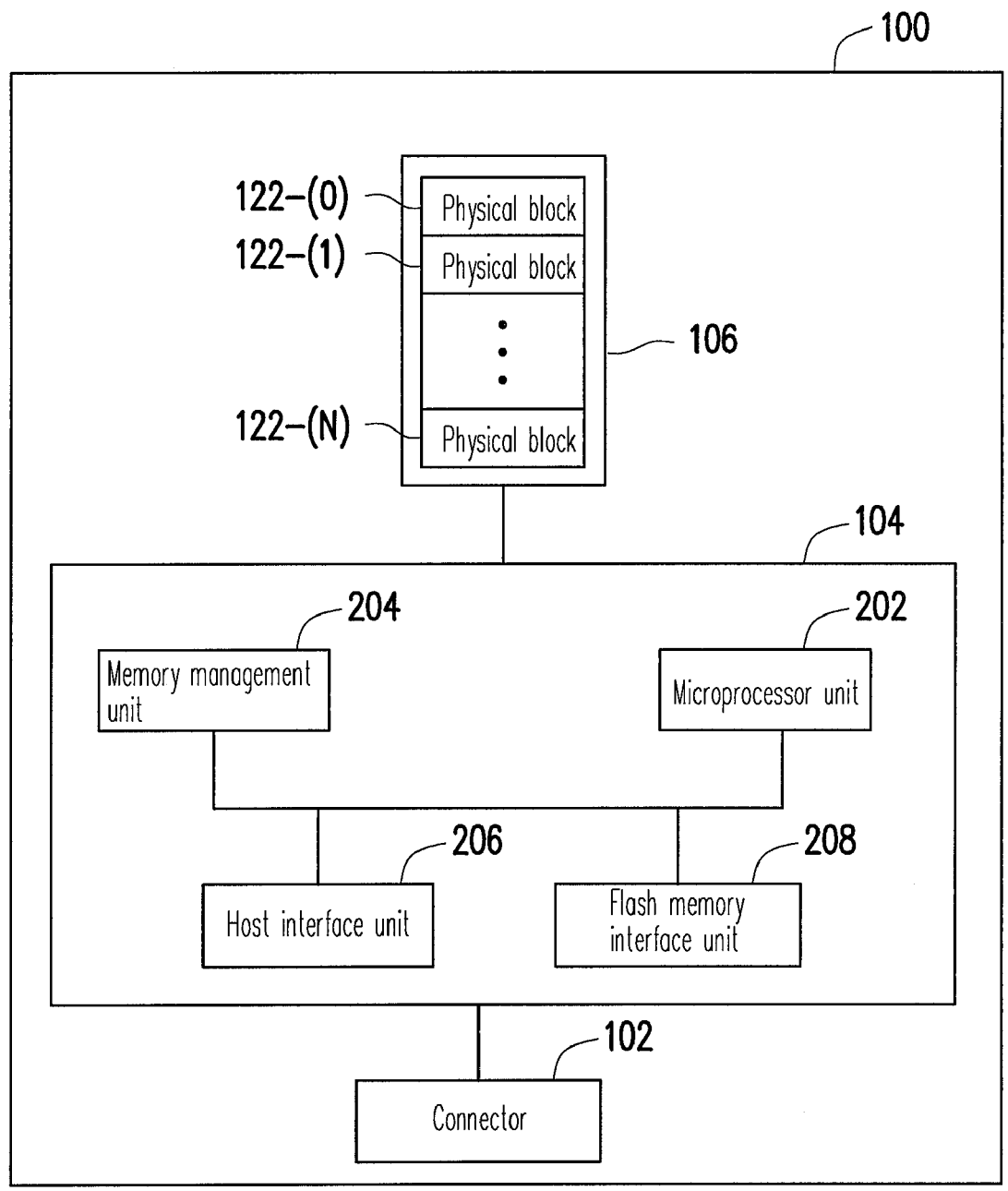
FIG. 1D is a detailed block diagram of the flash memory storage device in FIG. 1A.

FIG. 1D is a detailed block diagram of the flash memory storage device 100 in FIG. 1A.

Referring to FIG. 1D, the flash memory storage device 100 includes a connector 102, a flash memory controller 104, and a flash memory chip 106.

The connector 102 is coupled to the flash memory controller 104 and used for coupling to the host system 1000. In the present exemplary embodiment, the connector 102 is a serial advanced technology attachment (SATA) connector. However, the invention is not limited thereto, and the connector 102 may also be a parallel advanced technology attachment (PATA) connector, a universal serial bus (USB) connector, an Institute of Electrical and Electronic Engineers (IEEE) 1394 connector, a peripheral component interconnect (PCI) express connector, a secure digital (SD) interface connector, a memory stick (MS) interface connector, a multi media card (MMC) interface connector, a compact flash (CF) interface connector, an integrated device electronics (IDE) connector, or other suitable connectors.

The flash memory controller 104 executes a plurality of logic gates or control commands implemented in a hardware form or a firmware form and performs various data operations such as data writing, reading, and erasing in the flash memory chip 106 according to commands of the host system 1000. The flash memory controller 104 includes a microprocessor unit 202, a memory management unit 204, a host interface unit 206 and a flash memory interface unit 208.

The microprocessor unit 202 is a main control unit of the flash memory controller 104. The microprocessor unit 202 cooperates with the memory management unit 204, the host interface unit 206, and the flash memory interface unit 208 to carry out various operations of the flash memory storage device 100.

The memory management unit 204 is coupled to the microprocessor unit 202, and executes a data writing mechanism and a block management mechanism according to the present exemplary embodiment. Below, the operation of the memory management unit 204 is described in detail with reference to accompanying drawings.

In the present exemplary embodiment, the memory management unit 204 is implemented in the flash memory controller 104 in a firmware form. For example, the memory management unit 204 including a plurality of control instructions is burned into a program memory (for example, a read only memory (ROM)), and the program memory is embedded into the flash memory controller 104. When the flash memory storage device 100 is in operation, the control instructions of the memory management unit 204 are executed by the microprocessor unit 202 to accomplish the data writing mechanism and the block management mechanism according to the present embodiment.

In another exemplary embodiment of the present invention, the control commands of the memory management unit 204 are also stored in a specific area (for example, the system area of a flash memory chip exclusively used for storing system data) of the flash memory chip 106 as program codes. Similarly, the control commands of the memory management unit 204 are executed by the microprocessor unit 202 when the flash memory storage device 100 is in operation. In another exemplary embodiment of the present invention, the memory management unit 204 is also implemented in the flash memory controller 104 in a hardware form.

The host interface unit 206 is coupled to the microprocessor unit 202, and receives and identifies commands and data received from the host system 1000. Namely, the commands and data received from the host system 1000 are transmitted to the microprocessor unit 202 through the host interface unit 206. In the present exemplary embodiment, the host interface unit 206 is a SATA interface corresponding to the connector 102. However, it should be understood that the present invention is not limited thereto, and the host interface unit 206 may be also a PATA interface, a USB interface, an IEEE 1394 interface, a PCI express interface, a SD interface, a MS interface, a MMC interface, a CF interface, an IDE interface, or other suitable data transmission interfaces.

The flash memory interface unit 208 is coupled to the microprocessor unit 202 and configured for accessing the flash memory chip 106. Namely, data to be written into the flash memory chip 106 is converted by the flash memory interface unit 208 into a format acceptable to the flash memory chip 106.

Figure 2:
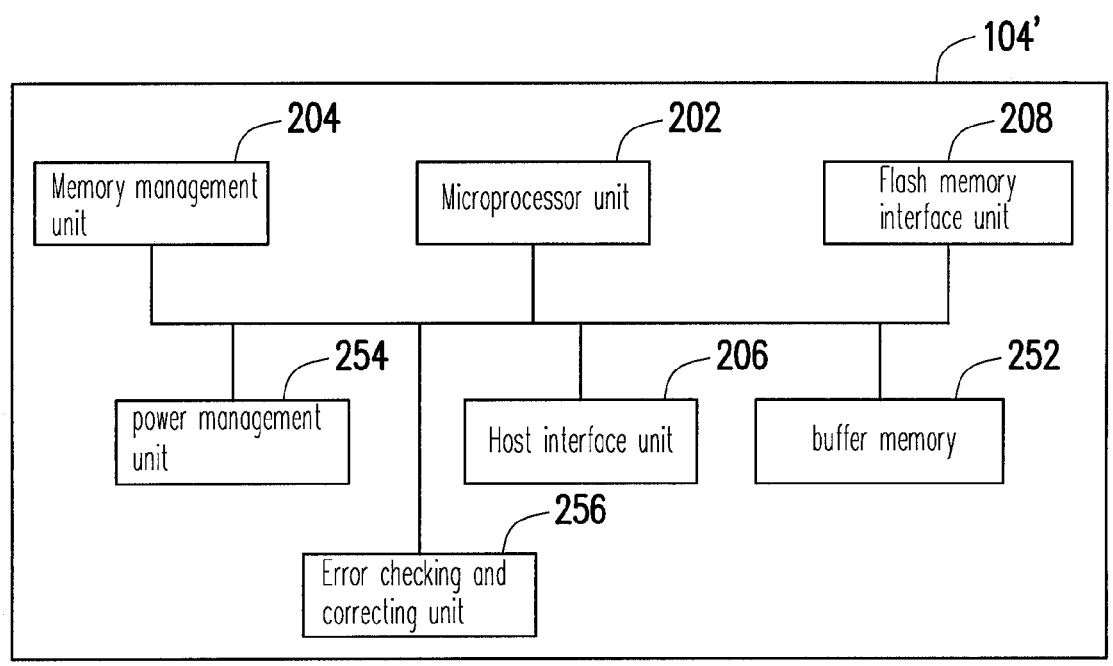
FIG. 2 is a schematic block diagram of a flash memory controller according to another exemplary embodiment of the invention.

In another exemplary embodiment of the present invention, the flash memory controller further includes other functional modules. FIG. 2 is a schematic block diagram of a flash memory controller according to another exemplary embodiment of the present invention.

Referring to FIG. 2, besides the microprocessor unit 202, the memory management unit 204, the host interface unit 206, and the flash memory interface unit 208, the flash memory controller 104' further includes a buffer memory 252, a power management unit 254, and an error correction unit 256.

The buffer memory 252 is coupled to the microprocessor unit 202 and configured for temporarily storing data and commands received from the host system 1000 or data received from the flash memory chip 106.

The power management unit 254 is coupled to the microprocessor unit 202, and configured to control the power supply of the flash memory storage device 100.

The error correction unit 256 is coupled to the microprocessor unit 202, and configured for executing an error correction procedure to ensure data accuracy. To be specific, when the memory management unit 204 receives a host write command from the host system 1000, the error correction unit 256 generates an error checking and correcting (ECC) code for the data corresponding to the host write command, and the memory management unit 204 writes the data and the corresponding ECC code into the flash memory chip 106. Subsequently, when the memory management unit 204 reads the data from the flash memory chip 106, the memory management unit 204 simultaneously reads the corresponding ECC code, and the error correction unit 256 executes the error correction procedure on the read data according to the ECC code.

Referring to FIG. 1D again, the flash memory chip 106 is coupled to the flash memory controller 104 for storing data. The flash memory chip 106 has a plurality of physical blocks 122-(0)~122-(N). Each physical block is the smallest erasing unit. That is to say, each physical block contains the least number of memory cells that are erased together. Each physical block has 128 physical pages (i.e., physical page addresses). In the present exemplary embodiment, each of the physical pages is the smallest programming unit. In other words, each physical page is the smallest unit for writing data or reading data. Each physical page usually includes a user data area and a redundancy area. The user data area is used for storing user data, and the redundancy area is used for storing system data (for example, the ECC code). However, it is not limited in the present invention that each physical block has 128 physical pages. In another exemplary embodiment of the present invention, each physical block may also have 64, 256, or other suitable numbers of physical pages. In the present exemplary embodiment, the flash memory chip 106 is a multi level cell (MLC) NAND flash memory chip. However, the present invention is not limited thereto, and the flash memory chip 106 may also be a single level cell (SLC) NAND flash memory chip.

Figure 3A:
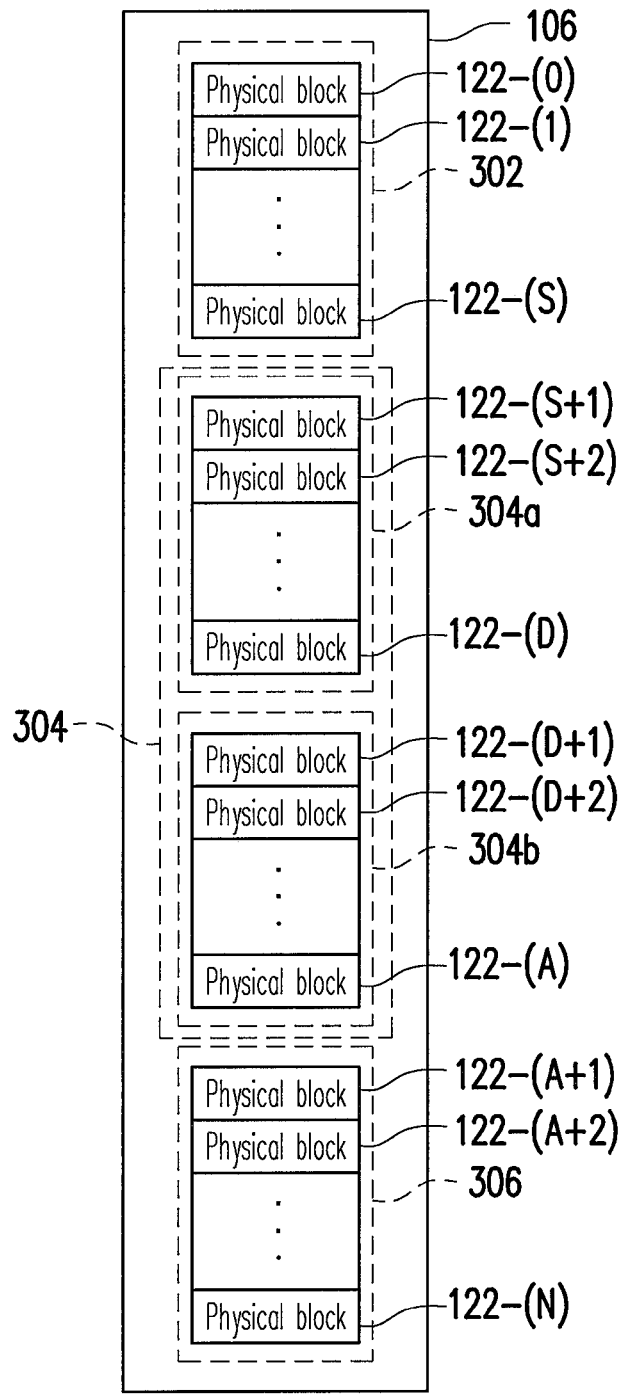
FIG. 3A is a block diagram of a flash memory chip according to the first exemplary embodiment of the present invention.

FIG. 3A is a block diagram of a flash memory chip according to the first exemplary embodiment of the present invention. It should be understood that the terms used herein for describing the operations (for example, "get", "select", "replace", "group", and "alternate", etc) performed on the physical blocks of a flash memory refer to logical operations performed on these physical blocks. Namely, the physical blocks in the flash memory are only logically operated and the actual positions thereof are not changed.

Referring to FIG. 3A, the memory management unit 204 logically groups the physical blocks into a system area 302, a storage area 304, and a replacement area 306.

The physical blocks 122-(0)~122-(S) logically belonging to the system area 302 are configured to record system data, wherein the system data includes the manufacturer and model of the flash memory chip, the number of zones in flash memory chip, the number of physical blocks in each zone, and the number of pages in each physical block.

The physical blocks 122-(S+1)~122-(A) logically belonging to the storage area 304 are configured to store data written by the host system 1000. Namely, the flash memory storage device 100 uses the physical blocks in the storage area 304 for actually storing data written by the host system 1000. To be specific, the physical blocks 122-(S+1)~122-(A) in the storage area 304 are further grouped into a data area 304a and a spare area 304b, wherein the physical blocks 122-(S+1)~122-(D) in the data area 304a are physical blocks full of data, and the physical blocks 122-(D+1)~122-(A) in the spare area 304b are physical blocks containing no data. To be more specific, when the memory management unit 204 gets a physical block from the spare area 304b and writes data into the gotten physical block, the gotten physical block is associated to the data area 304a, and after the memory management unit 204 erases a physical block associated to the data area 304a, the erased physical block is associated to the spare area 304b.

The physical blocks 122-(A+1)~122-(N) logically belonging to the replacement area 306 are replacement physical blocks. For example, when the flash memory chip 106 is manufactured, 4% of its physical blocks are reserved for replacement purpose. Namely, when the physical blocks in the system area 302 and the storage area 304 are damaged, the physical blocks reserved in the replacement area 306 can be used for replacing the damaged physical blocks (i.e., bad blocks). Thus, if there are still normal physical blocks in the replacement area 306 and a physical block is damaged, the memory management unit 204 gets a normal physical block from the replacement area 306 for replacing the damaged physical block. If there is no more normal physical block in the replacement area 306 and a physical block is damaged, the flash memory storage device 100 is announced as being in a write-protect status and cannot be used for writing data anymore.

It has to be understood that the grouping relationships of grouping the physical blocks 122-(0)~122-(N) into the system area 302, the data area 304a, the spare area 304b, and the replacement area 306 are dynamically changed during the operation of the flash memory storage device 100. Namely, after the memory management unit 204 writes data into a physical block originally belonging to the spare area 304b (for example, the physical block 122-(D+2)), the physical block is associated to the data area 304a. Or, when a physical block in the data area 304a (or the spare area 304b) is damaged and accordingly replaced by a physical block gotten from the replacement area 306, the physical block originally in the replacement area 306 is associated to the data area 304a (or the spare area 304b).

Figure 3B:
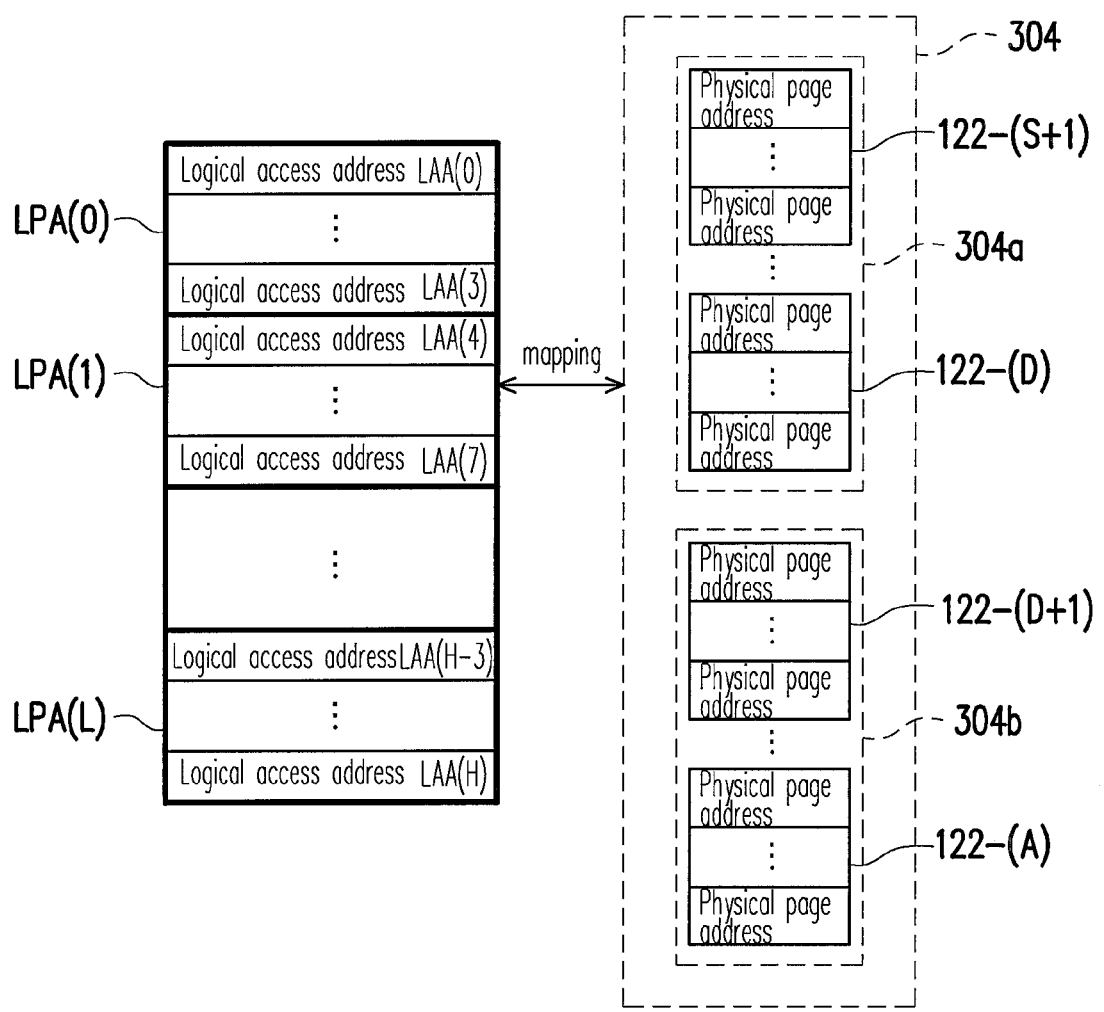
FIG. 3B is a diagram illustrating mapping relationships between logical page addresses and physical page addresses according to the first exemplary embodiment of the present invention.

Because the flash memory storage device 100 alternatively uses the physical blocks in the storage area 304 for storing data written by the host system 1000, the memory management unit 204 provides logical access addresses LAA(0)~LAA(H) to the host system 1000 for accessing data. In particular, in the exemplary embodiment, the memory management unit 204 groups the logical access addresses LAA(0)~LAA(H) into logical page addresses LPA(0)~LPA(L) and maps the logical page addresses LPA(0)~LPA(L) to the physical page addresses of the physical blocks of the storage area 304 (as shown in FIG. 3B). In the exemplary embodiment, the memory management unit 204 may use a mathematics formula to map the logical access addresses to the logical page addresses. In the exemplary embodiment, each logical page address is composed of 4 logical access addresses. For example, the logical access addresses LAA(0)~LAA(3) belong to the logical page address LPA(0); the logical access addresses LAA(4)~LAA(7) belong to the logical page address LPA(1); the logical access addresses LAA(8)~LAA(11) belong to the logical page address LPA(2)

and so on. Here, each logical access address may be a sector or a cluster. Additionally, the memory management unit 204 maintains a logical page-physical page mapping table and a physical page-logical page mapping table to record the mapping relationships between the logical page addresses and the physical page addresses. That is, when the host system 1000 is about to access data at a logical access address, the memory management unit 204 identifies a logical page address mapped to the logical access address, and therefore accesses data at a physical page address mapped to the logical page address.

In the exemplary embodiment, the memory management unit 204 records an address center and an address radius for the physical block which has been used for storing data, and writes data into the flash memory chip 106 according to a logical access address to be written by the host system 1000 (refer to a written logical access address, thereafter), and an address center and an address radius of an opened physical block.

To be specific, an address center of a physical block means a first logical access address of a logical page address corresponding to first data which is written into the physical block. That is, when the memory management unit 204 gets a physical block from the spare area 304b and writes data into the gotten physical block, a first logical access address of the logical page address corresponding to the data is set to be the address center of the gotten physical block. However, the present invention is not limited thereto, the address center of the physical block also can be other logical access address of the logical page address corresponding to the first data which is written into the physical block. Additionally, an address radius of a physical block is used for controlling the degree of data dispersion in the physical block. The address radius of each physical block may be any suitable value predetermined, and the address radiuses of the physical blocks may be the same as each other or not be the same as each other. In the exemplary embodiment, the address radius of each physical block is set to be 130 page addresses. In particular, in the exemplary embodiment, a distance between one of logical access addresses corresponding to data stored in a physical block and the address center of the physical block (i.e., an absolute value calculated by subtracting the address center of the physical block from one of logical access addresses corresponding to data stored in a physical block) must be smaller than or equal to the address radius of the physical block, as formula (1):

$$|LPA(PPA(t)) - C(PPA(t))| \leq R(PPA(t)) \qquad \text{Formula (1)}$$

LPA(PPA(t)) represents the logical access address corresponding to data stored at a t physical page address in the flash memory chip 106, C(PPA(t)) represents an address center of a physical block that the t physical page address belongs to, and R(PPA(t)) represents an address radius of a physical block that the t physical page address belongs to. In the exemplary embodiment, the memory management unit 204 records the address radiuses of physical blocks by maintaining a physical block address center table having a physical block index field and an address center field (not shown).

In the exemplary embodiment, when the host system 1000 is about to write data into the logical access addresses LAA(0)~LAA(H), the memory management unit 204 writes the data into an opened physical block. Here, the opened physical block means a physical block in which data has been written into some physical page addresses. That is, when the memory management unit 204 gets a physical block from the spare area 304b and writes data into a portion of the physical page addresses in the gotten physical block, the gotten physical block will be referred to an opened physical block. In a status where there are opened physical blocks in the flash memory storage device 100, when the host system 1000 is about to write data into the logical access addresses LAA(0)~LAA(H), the memory management unit 204 orderly writes the data from the host system 100 into the opened physical blocks under the condition that the formula (1) is satisfied. And, in a status where there is no any opened physical block in the flash memory storage device 100, when the host system 1000 is about to write data into the logical access addresses LAA(0)~LAA(H), the memory management unit 204 gets a physical block as an opened physical block and orderly writes the data from the host system 100 into the gotten physical block.

For example, when the memory management unit 204 starts to use the physical block 122-(D+1) for storing data to be written by the host system 1000, the memory management unit 204 orderly writes the data into the physical page addresses of the physical block 122-(D+1) under the condition that the formula (1) is satisfied, even though the logical page addresses, that the logical access addresses written by the host system 1000 belong to, are not continuous. That is, under the condition that the formula (1) is satisfied, the memory management unit 204 orderly uses the physical page addresses in an opened physical block to write data written by the host system 1000, and only when all the physical page addresses in the opened physical block have been filled with data, the memory management unit 204 gets another physical block which is empty (i.e., the memory management unit 204 gets one physical block from the spare area 304b) and orderly writes the data into the physical page addresses of the newly gotten physical block. In the exemplary embodiment, after the memory management unit 204 writes the data into the physical page addresses, the memory management unit 204 updates the logical page-physical page mapping table and the physical page-logical page mapping table to correctly record the mapping relationships between the logical page addresses and the physical page addresses.

Noticeably, in the exemplary embodiment of the present invention, the number of the opened physical blocks must be smaller than an opened physical block threshold value during the operation of the flash memory storage device 100. In details, because the resource of the flash memory storage device 100 (e.g., the size of the buffer memory or the number of the physical blocks in the flash memory chip) is limited, the number of opened physical blocks used by the memory management unit 204 must be limited. In the exemplary embodiment, the opened physical block threshold value is set as "5" (i.e., the memory management unit 204 uses 4 opened physical blocks at most), however, it should be noticed that the present invention is not limited thereto.

FIG. 4A and FIG. 4B are diagrams illustrating a logical page-physical page mapping table and a physical page-logical page mapping table according to an example of the first exemplary embodiment of the present invention. In this example, the physical page addresses PPA(0)~PPA(K) of the physical block in the storage area 304 map to the logical page addresses LPA(0)~LPA(L) in the above-mentioned alternative manner. In the exemplary embodiment, the logical page-physical page mapping table 410 has a logical page index field and a physical page address field for recording the physical pages mapped to the logical pages, and the physical page-logical page mapping table 420 has a physical page index field and a logical page address field for recording the logical pages mapped to the physical pages.

Referring to FIGS. 4A and 4B, it is assumed that the logical page addresses LPA-(0)~LPA-(L) is mapped to the physical page addresses PPA-(0)~PPA-(L), respectively. That is, the physical page addresses PPA-(0)~PPA-(L) have been used to store data written in the logical page addresses LPA-(0)~LPA-(L) by the host system 1000. Additionally, at this status, there is no any opened physical block in the flash memory device 100.

FIG. 5A and FIG. 5B are diagrams illustrating a logical page-physical page mapping table and a physical page-logical page mapping table corresponding to an example of writing data according to the first exemplary embodiment of the present invention.

Referring to FIGS. 5A and 5B, under the status shown in FIGS. 4A and 4B, when the host system 1000 is about to write data into the logical access addresses LAA(4)~LAA(6), the memory management unit 204 identifies that the logical access addresses LAA(4)~LAA(6) belong to the logical page address LPA(1); gets a physical block (e.g., the physical block 122-(D+1) having the physical page addresses PPA(L+1)~PPA(L+128)); and writes the data written by the host system 1000 into the physical page address PPA(L+1). Additionally, the memory management unit 204 updates the mapping relationships in the logical page-physical page mapping table 410 to map the logical page address LPA(1) to the physical page address PPA(L+1), and updates the mapping relationships in the physical page-logical page mapping table 420 to map the physical page address PPA(L+1) to the logical page address LPA(1). At this time, the physical block 122-(D+1) will become an opened physical block in the flash memory storage device 100, and the logical access address LAA(4) is set to be the address center of the opened physical block 122-(D+1). Here, the first logical access address (i.e., the logical access address LAA(4)) of the logical page address LPA(1) is used to be the address center of the opened physical block 122-(D+1). However, the present invention is not limited thereto, and in another exemplary embodiment, any one of the logical access addresses LAA(4)~LAA(7) may be used to be the address center of the opened physical block 122-(D+1). Additionally, it should be noticed that the access of the flash memory chip 106 is in unit of each physical page. Even though the host system 1000 only writes data into the logical access addresses LAA(4)~LAA(6), the memory management unit 206 must write data of the entire logical page address LPA(1) (i.e., data of the logical access addresses LAA(4)-LAA(7)) into the mapped physical page address.

FIG. 6A and FIG. 6B are diagrams illustrating a logical page-physical page mapping table and a physical page-logical page mapping table corresponding to another example of writing data according to the first exemplary embodiment of the present invention.

Referring to FIGS. 6A and 6B, under the status shown in FIGS. 5A and 5B, when the host system 1000 is about to write data into the logical access address LAA(13), the memory management unit 204 identifies that the logical access address LAA(13) belongs to the logical page address LPA(3); and identifies that a distance between the logical access address LAA(13) and the address center of the opened physical block 122-(D+1) (i.e., the logical access address LAA(4)) is smaller than the address radius of the opened physical block 122-(D+1) (i.e., 130 logical access addresses). Therefore, the memory management unit 204 writes the data written by the host system 1000 into the physical page address PPA(L+2). Additionally, the memory management unit 204 updates the mapping relationships in the logical page-physical page mapping table 410 to map the logical page address LPA(3) to the physical page address PPA(L+2), and updates the mapping relationships in the physical page-logical page mapping table 420 to map the physical page address PPA(L+2) to the logical page address LPA(3).

FIG. 7A and FIG. 7B are diagrams illustrating a logical page-physical page mapping table and a physical page-logical page mapping table corresponding to another example of writing data according to the first exemplary embodiment of the present invention.

Referring to FIGS. 7A and 7B, under the status shown in FIGS. 6A and 6B, when the host system 1000 is about to write data into the logical access address LAA(518), the memory management unit 204 identifies that the logical access address LAA(518) belongs to the logical page address LPA (129); and identifies that a distance between the logical access address LAA(518) and the address center of the opened physical block 122-(D+1) (i.e., the logical access address LAA(4)) is larger than the address radius of the opened physical block 122-(D+1) (i.e., 130 logical access addresses). Therefore, there is no any opened physical block for being used to store the data written into the logical page address LPA(129) under the condition that the formula (1) is satisfied in the flash memory storage device 100. In this example, the memory management unit 204 gets one physical block (e.g., the physical block 122-(D+2) having the physical page addresses PPA(L+129)~PPA(L+256)) from the spare area 304b and writes the data written by the host system 1000 into the physical page address PPA(L+129). Additionally, the memory management unit 204 updates the mapping relationships in the logical page-physical page mapping table 410 to map the logical page address LPA(129) to the physical page address PPA(L+129), and updates the mapping relationships in the physical page-logical page mapping table 420 to map the physical page address PPA(L+129) to the logical page address LPA(129). At this time, the physical block 122-(D+2) will become another opened physical block in the flash memory storage device 100, and the logical access address LAA(516) is set to be the address center of the opened physical block 122-(D+2).

FIG. 8A and FIG. 8B are diagrams illustrating a logical page-physical page mapping table and a physical page-logical page mapping table corresponding to another example of writing data according to the first exemplary embodiment of the present invention.

Referring to FIGS. 8A and 8B, under the status shown in FIGS. 7A and 7B, when the host system 1000 is about to write data into the logical access addresses LAA(84)~LAA(87), the memory management unit 204 identifies that the logical access addresses LAA(84)~LAA(87) belong to the logical page address LPA(21); and identifies that a distance between the logical access address LAA(84) and the address center of the opened physical block 122-(D+1) (i.e., the logical access address LAA(4)) is smaller than the address radius of the opened physical block 122-(D+1) (i.e., 130 logical access addresses) and a distance between the logical access address LAA(84) and the address center of the opened physical block 122-(D+2) (i.e., the logical access address LAA(516)) is larger than the address radius of the opened physical block 122-(D+2) (i.e., 130 logical access addresses). Therefore, the memory management unit 204 writes the data written by the host system 1000 into the physical page address PPA(L+3) of the opened physical block 122-(D+1). Additionally, the memory management unit 204 updates the mapping relationships in the logical page-physical page mapping table 410 to map the logical page address LPA(21) to the physical page address PPA(L+3), and updates the mapping relationships in the physical page-logical page mapping table 420 to map the physical page address PPA(L+3) to the logical page address LPA(21).

In the exemplary embodiment, the memory management unit 204 compares the records in the logical page-physical page mapping table 410 and the physical page-logical page mapping table 420 to determine which physical page addresses are invalid physical page addresses and valid physical page addresses. Here, the invalid physical page addresses are the physical page addresses stored old and invalid data, and the valid physical page addresses are the physical page addresses stored valid data and the valid physical page addresses currently are mapped to the logical page addresses. For example, taking FIGS. 8A and 8B as an example, during the step of determining whether the physical page address PPA(0) is the valid physical page address, the memory management unit 204 identifies that the logical page address which is mapped to the physical page address PPA(0) is the logical page address LPA(0) according to the physical page-logical page mapping table 420, and identifies that the physical page address which is mapped to the logical page address LPA(0) is the physical page address PPA(0) according to the logical page-physical page mapping table 410. Hence, the physical page address PPA(0) is the valid physical page address. Additionally, for example, during the step of determining whether the physical page address PPA(1) is the valid physical page address, the memory management unit 204 identifies that the logical page address which is mapped to the physical page address PPA(1) is the logical page address LPA(1) according to the physical page-logical page mapping table 420, and identifies that the physical page address which is mapped to the logical page address LPA(1) is the physical page address PPA(L+1) according to the logical page-physical page mapping table 410. Hence, the physical page address PPA(1) is the invalid physical page address. That is, the memory management unit 204 identifies a mapped logical page address mapping to the physical page address to be determined according to the physical page-logical page mapping table 420 and identifies a mapped physical page address mapping to the mapped logical page address according to the logical page-physical page mapping table 410. When the physical page address to be determined is identical to the mapped physical page address, the physical page address to be determined is the valid physical page address. Otherwise, the physical page address to be determined is the invalid physical page address.

It should be noticed that the number of the opened physical blocks that the memory management unit 204 can use at most is limited due to the opened physical block threshold value in the exemplary embodiment. Therefore, when the memory management unit 204 needs to get a physical block to be an opened physical block, the memory management unit 204 determines whether the number of the opened physical blocks which are used currently is smaller than the opened physical block threshold value. In particular, if the number of the opened physical blocks that are used currently is not smaller than the opened physical block threshold value, the memory management unit 204 performs a data organizing process to fill the physical page addresses which are empty in one of the opened physical blocks with valid data and performs an invalid data erasing process to erase at least one physical block only stored invalid data. Accordingly, the erased physical block is associated to the spare area 304b to release the physical block stored invalid data. To be specific, in the data organizing process, the memory management unit 204 copies valid data at valid physical page addresses of other physical blocks into the opened physical blocks through the above-mentioned comparing, such that the physical page addresses in one of the opened physical blocks are filled with data and the opened physical block is associated to the data area 304a. Additionally, in the flash memory chip 106, a smallest unit for erasing data is one physical block. Thus, in the invalid data erasing process, the memory management unit 204 organizes data at the valid physical page addresses through the above-mentioned comparing, such that data stored in the physical page addresses of at least one physical block in the data area 304a become invalid data. Accordingly, the physical block that only stores invalid data may be erased and associated to the spare area 304b. For example, the memory management unit 204 copies data in the valid physical page addresses within one physical block to the physical page addresses within another physical block which is not filled with data and an erase operation is carried out on the physical block. So, the dispersed valid data is merged and the invalid physical page addresses are released.

For example, after valid data is merged to release a physical block which only stores invalid data, the memory management unit 204 updates the physical page-logical page mapping table 420 to set the mapping relationships corresponding to the physical page addresses of the erased physical block as "NULL". Noticeably, during the data organizing process and the invalid data erasing process are performed to move valid data, the memory management unit 204 assures that logical page addresses corresponding to data store in each physical block meet the formula (1).

According to the examples described above, when the host interface unit 206 of the flash memory controller 104 receives a host write command and write-in data from the host system 1000, the memory management unit 204 determines whether there is at least one available physical block among the opened physical blocks for writing the write-in data under the condition that the formula (1) is satisfied. When there are available physical blocks, the memory management unit 204 writes the write-in data into one of the available physical blocks, and otherwise, the memory management unit 204 gets one physical block from the spare area 304b as an opened physical block for writing the write-in data. The data writing method of the present embodiment will be explained in details with drawings.

Figure 9:
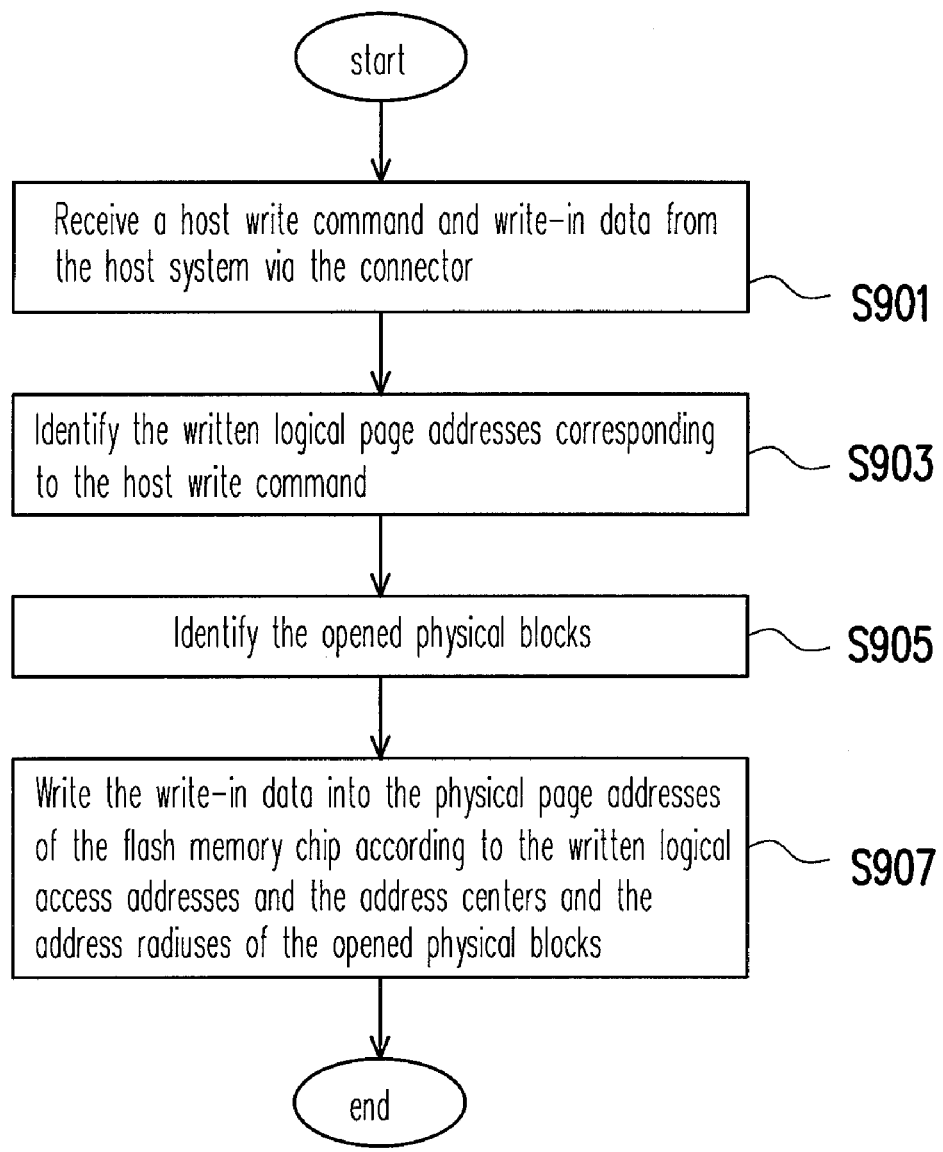
FIG. 9 is a flowchart illustrating a data writing method according to the first embodiment of the present invention.

FIG. 9 is a flowchart illustrating a data writing method according to the first embodiment of the present invention.

Referring to FIG. 9, in step S901, the host interface unit 206 receives a host write command and write-in data from the host system 1000 via the connector 102. Then, in step S903, the memory management unit 204 identifies the written logical page addresses (i.e., the logical page addresses corresponding to the logical access addresses written by the host system 1000) corresponding to the host write command, and in step S905, the memory management unit 204 identifies the opened physical blocks. Finally, in step S907, the memory management unit 204 writes the write-in data into the physical page addresses of the flash memory chip 106 according to the written logical access addresses and the address centers and the address radiuses of the opened physical blocks.

Figure 10:
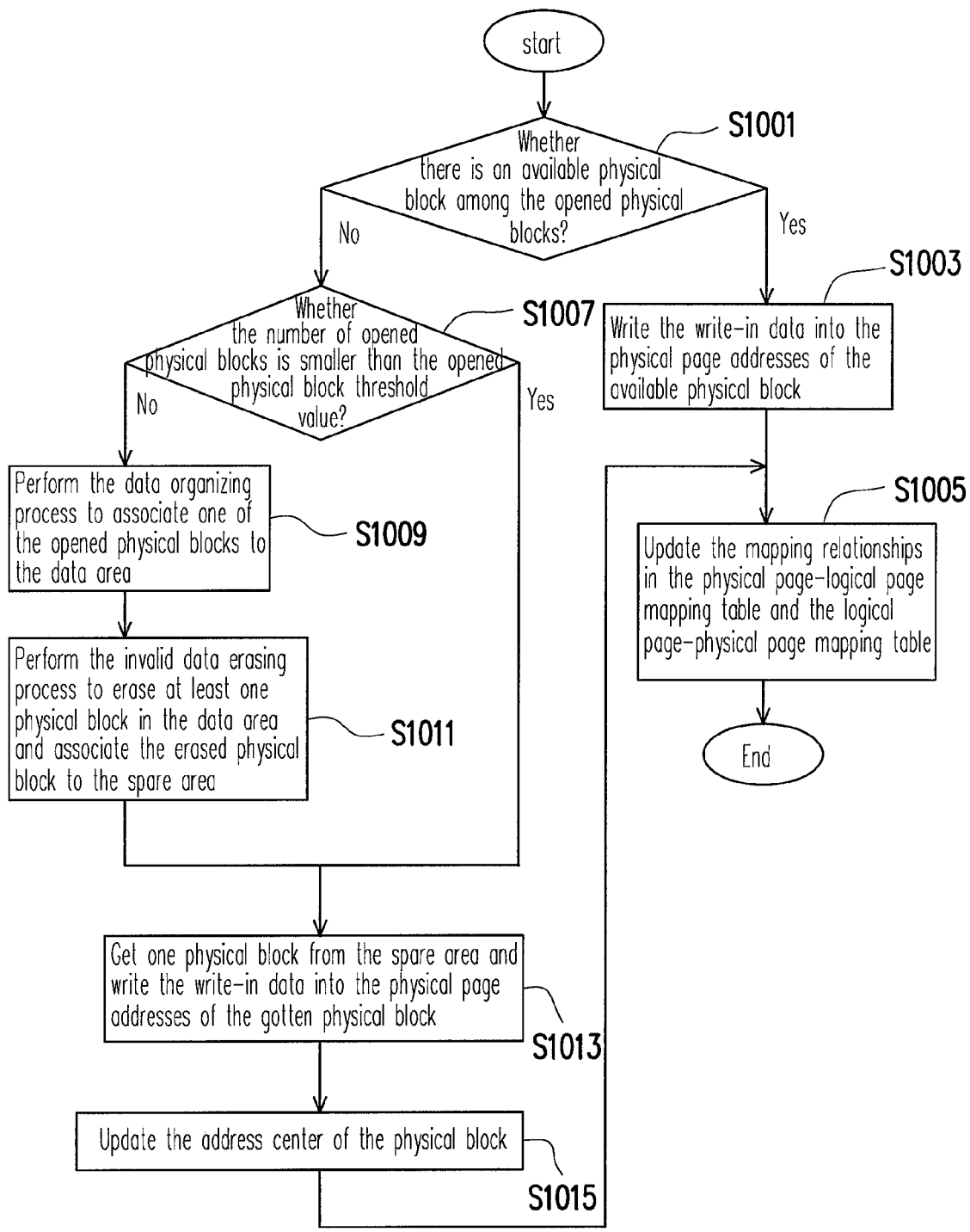
FIG. 10 is a flowchart illustrating detail steps of step S907 shown in FIG. 9.

FIG. 10 is a flowchart illustrating detail steps of step S907 shown in FIG. 9.

Referring to FIG. 10, in step S1001, the memory management unit 204 determines whether there is an available physical block among the opened physical blocks, wherein the address radius of the available physical block is larger than a distance between one of the written logical access addresses and the address center of the available physical block (i.e., the formula (1) must be satisfied).

If it is determined in step S1001 that there is the available physical block among the opened physical blocks, then in step S1003, the write-in data is written into the physical page addresses of the available physical block. After step S1003, in step S1005, the memory management unit 204 updates the mapping relationships in the physical page-logical page mapping table 420 and the logical page-physical page mapping table 410 (e.g., as shown in FIGS. 8A and 8B), and the process shown in FIG. 10 is terminated.

It should be mentioned that if it is determined in step S1001 that there are a plurality of available physical blocks, the memory management unit 204 selects any one of the available physical blocks for writing the write-in data. Or, the memory management unit 204 may select one of the available physical blocks for writing the write-in data according to the distance between the written logical access addresses and the address center of each available physical block, wherein the distance between the address center of the selected available physical blocks and the written logical access addresses is the shortest.

If it is determined in step S1001 that there is no any available physical block among the opened physical blocks, then in step S1007 the memory management unit 204 determines whether the number of opened physical blocks is smaller than the opened physical block threshold value.

If it is determined in step S1007 that the number of opened physical blocks is not smaller than the opened physical block threshold value, then in step S1009, the data organizing process is performed to associate one of the opened physical blocks to the data area 304a, and in step S1011, the invalid data erasing process is performed to erase at least one physical block in the data area 304a and associate the erased physical block to the spare area 304b.

After that, in step S1013, the memory management unit 204 gets one physical block from the spare area 304b and writes the write-in data into the physical page addresses of the gotten physical block. After step S1013, in step S1015, the memory management unit 204 updates the address center of the physical block. To be specific, in step S1015, the memory management unit 204 sets the address center of the physical block gotten in step S1013 to be one of the logical access addresses of the written logical page address identified in step S903, and sets the address center of the physical block gotten in step S1011 to be "NULL". And, step S1005 is executed and the process shown in the FIG. 10 is terminated after step S1015.

Second Exemplary Embodiment

A flash memory storage device and a host system in the second exemplary embodiment essentially are similar to the flash memory storage device and the host system in the first exemplary embodiment, wherein the difference is a memory management unit in the second exemplary embodiment groups the logical page addresses into the logical page address groups and writes data from the host system in unit of each logical page address group. Here, FIGS. 1A, 1D and 3A are used for describing the second exemplary embodiment of the present invention.

Figure 11:
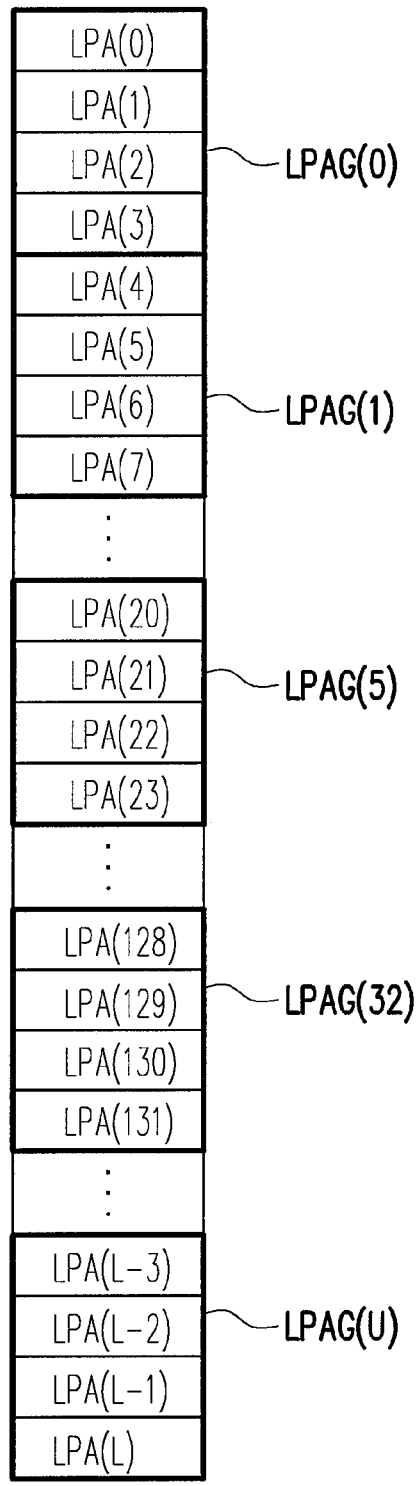
FIG. 11 is a diagram illustrating the grouping of the logical page addresses according to a second exemplary embodiment of the present invention.

FIG. 11 is a diagram illustrating the grouping of the logical page addresses according to the second exemplary embodiment of the present invention.

Referring FIG. 11, in the exemplary embodiment, the memory management unit 204 groups the logical page addresses LPA(0)~LPA(L) into logical page address groups LPAG(0)~LPAG(U), wherein each logical page address group is composed of 4 logical page addresses. However, the present invention is not limited thereto.

In particular, in the exemplary embodiment, the memory management unit 204 writes data in unit of each logical page address group. To be specific, in a case where the host system 1000 only writes data into the logical access addresses LAA(4)~LAA(7) and the logical page addresses LPA(0)~LPA(3) belong to the same logical page address group LPAG(0), the memory management unit 204 identifies that the logical access addresses LAA(4)~LAA(7) belong to the logical page address LPA(1); reads data belong to the logical page addresses LPA(0), LPA(2) and LPA(3) from the flash memory chip 106 according to the physical page-logical page mapping table 420 and the logical page-physical page mapping table 410; and writes the data from the host system 1000 and the read data into the flash memory chip 106 in unit of the logical page address group LPAG(0).

FIG. 12A and FIG. 12B are diagrams illustrating a logical page-physical page mapping table and a physical page-logical page mapping table corresponding to an example of writing data according to the second exemplary embodiment of the present invention.

Referring FIGS. 12A and 12B, under the status shown in FIGS. 4A and 4B, when the host system 1000 is about to write data into the logical access addresses LAA(4)~LAA(7), the memory management unit 204 identifies that the host system 1000 only writes the data into the logical page address LPA(1) that the logical access addresses LAA(4)~LAA(7) belong to, but not the entire logical page address group that the logical page address LPA(1) belongs to. In this example, the memory management 204 read data belong to the logical page addresses LPA(0), LPA(2) and LPA (3) from the physical page addresses PPA(0), PPA(2) and PPA(3); gets one physical block (e.g., the physical block 122-(D+1) having the physical page addresses PPA(L+1)~PPA(L+128)) from the spare area 304b; and orderly writes the read data belong to the logical page address LPA(0), the data written into the logical page address LPA(1) by the host system 1000, the read data belong to the logical page address LPA(2) and the read data belong to the logical page address LPA(3) into the physical page addresses PPA(L+1), PPA(L+2), PPA(L+3) and PPA(L+4). Additionally, the memory management unit 204 updates the mapping relationships in the logical page-physical page mapping table 410 to map the logical page address LPA(0) to the physical page address PPA(L+1), map the logical page address LPA(1) to the physical page address PPA(L+2), map the logical page address LPA(2) to the physical page address PPA(L+3), and map the logical page address LPA(3) to the physical page address PPA(L+4). Additionally, the memory management unit 204 updates the mapping relationships in the physical page-logical page mapping table 420 to map the physical page address PPA(L+1) to the logical page address LPA(0), map the physical page address PPA(L+2) to the logical page address LPA(1), map the physical page address PPA(L+3) to the logical page address LPA(2), and map the physical page address PPA(L+4) to the logical page address LPA(3). At this time, the physical block 122-(D+1) will become an opened physical block in the flash memory storage device 100, and the logical access address LAA(4) is set to be the address center of the opened physical block 122-(D+1).

FIG. 13A and FIG. 13B are diagrams illustrating a logical page-physical page mapping table and a physical page-logical page mapping table corresponding to another example of writing data according to the second exemplary embodiment of the present invention.

Referring to FIGS. 13A and 13B, under the status shown in FIGS. 12A and 12B, when the host system 1000 is about to write data into the logical access addresses LAA(516)~LAA(519), the memory management unit 204 identifies that a distance between the logical access address LAA(516) and the address center of the opened physical block 122-(D+1) (i.e., the logical access address LAA(4)) is larger than the address radius of the opened physical block 122-(D+1) (i.e., 130 logical access addresses). Therefore, there is no any opened physical block for being used to store the data written into the logical access addresses LAA(516)~LAA(519) under the condition that the formula (1) is satisfied in the flash memory storage device 100. Additionally, the memory management unit 204 identifies that the host system 1000 only writes the data into the logical page address LPA(129) that the logical access addresses LAA(516)~LAA(519) belong to, but not the entire logical page address group that the logical page address LPA(129) belongs to. In this example, the memory management 204 read data belong to the logical page addresses LPA(128), LPA(130) and LPA (131) from the physical page addresses PPA(128), PPA(130) and PPA(131); gets one physical block (e.g., the physical block 122-(D+2) having the physical page addresses PPA(L+129)~PPA(L+256)) from the spare area 304b; and orderly writes the read data belong to the logical page address LPA(128), the data written into the logical page address LPA(129) by the host system 1000, the read data belong to the logical page address LPA(130) and the read data belong to the logical page address LPA(131) into the physical page addresses PPA(L+129), PPA(L+130), PPA(L+131) and PPA(L+132). At this time, the memory management unit 204 updates the mapping relationships in the logical page-physical page mapping table 410 to map the logical page address LPA(128) to the physical page address PPA(L+129), map the logical page address LPA(129) to the physical page address PPA(L+130), map the logical page address LPA(130) to the physical page address PPA(L+131), and map the logical page address LPA(131) to the physical page address PPA(L+132). And, the memory management unit 204 updates the mapping relationships in the physical page-logical page mapping table 420 to map the physical page address PPA(L+129) to the logical page address LPA(128), map the physical page address PPA(L+130) to the logical page address LPA(129), map the physical page address PPA(L+131) to the logical page address LPA(130), and map the physical page address PPA(L+132) to the logical page address LPA(131). In this example, the physical block 122-(D+2) will become another opened physical block in the flash memory storage device 100, and the logical access address LAA(516) is set to be the address center of the opened physical block 122-(D+2).

FIG. 14A and FIG. 14B are diagrams illustrating a logical page-physical page mapping table and a physical page-logical page mapping table corresponding to another example of writing data according to the second exemplary embodiment of the present invention.

Referring to FIGS. 14A and 14B, under the status shown in FIGS. 13A and 13B, when the host system 1000 is about to write data into the logical access addresses LAA(80)~LAA(95), the memory management unit 204 identifies that a distance between the logical access address LAA(80) and the address center of the opened physical block 122-(D+1) (i.e., the logical access address LAA(4)) is smaller than the address radius of the opened physical block 122-(D+1) (i.e., 130 logical access addresses) and a distance between the logical access address LAA(80) and the address center of the opened physical block 122-(D+2) (i.e., the logical access address LAA(516)) is larger than the address radius of the opened physical block 122-(D+2) (i.e., 130 logical access addresses). Additionally, the memory management unit 204 identifies that the host system 1000 is about to write data into the entire physical page address group LPAG(5). Therefore, in this example, the memory management unit 204 orderly writes the data written into the logical page addresses LPA(20), LPA(21), LPA(22) and LPA(23) by the host system 1000 into the physical page addresses PPA(L+5), PPA(L+6), PPA(L+7) and PPA(L+8). Additionally, the memory management unit 204 updates the mapping relationships in the logical page-physical page mapping table 410 to map the logical page address LPA(20) to the physical page address PPA(L+5), map the logical page address LPA(21) to the physical page address PPA(L+6), map the logical page address LPA(22) to the physical page address PPA(L+7), and map the logical page address LPA(23) to the physical page address PPA(L+8). And, the memory management unit 204 updates the mapping relationships in the physical page-logical page mapping table 420 to map the physical page address PPA(L+5) to the logical page address LPA(20), map the physical page address PPA(L+6) to the logical page address LPA(21), map the physical page address PPA(L+7) to the logical page address LPA(22), and map the physical page address PPA(L+8) to the logical page address LPA(23).

Figure 15:
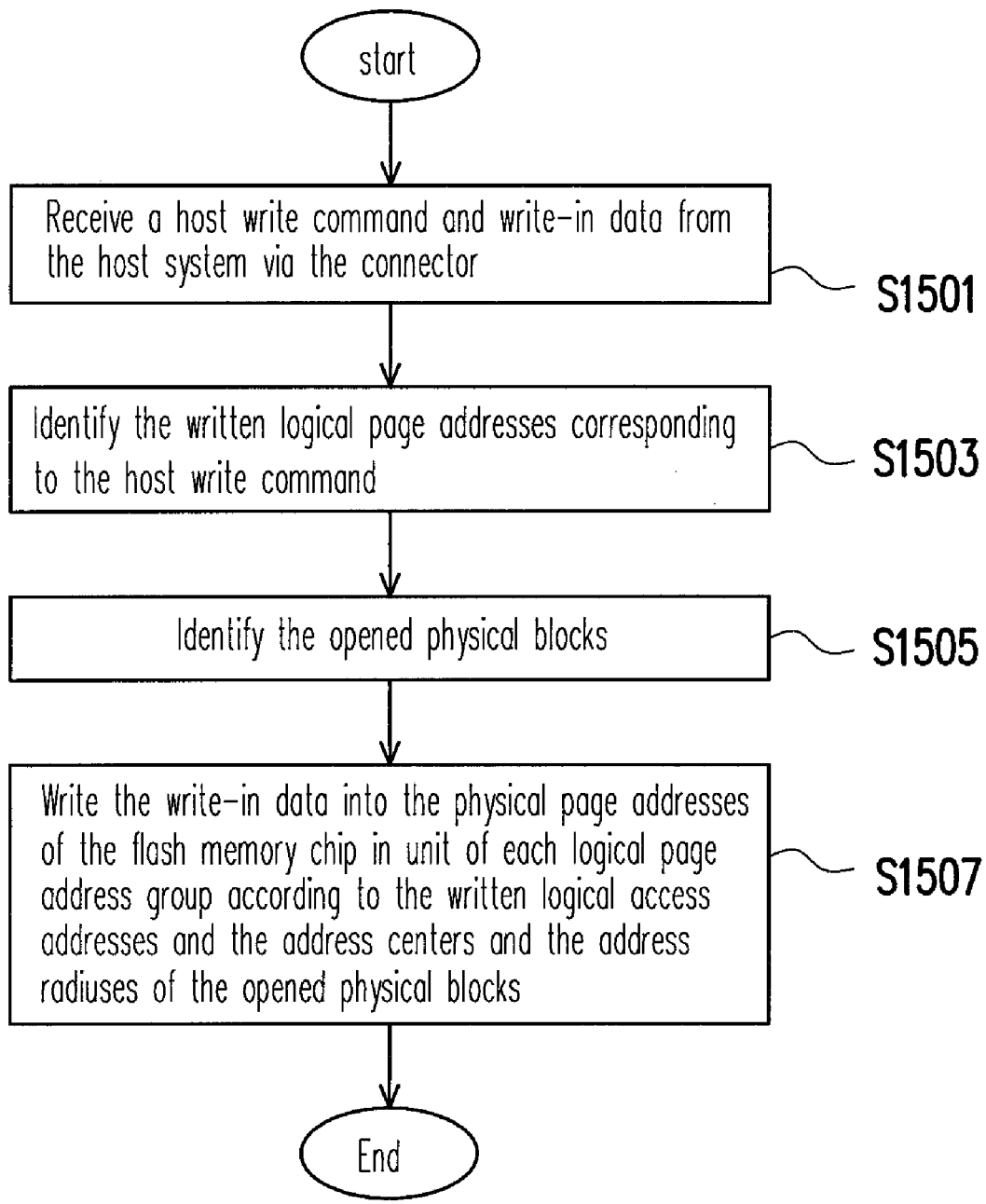
FIG. 15 is a flowchart illustrating a data writing method according to the second exemplary embodiment of the present invention.

FIG. 15 is a flowchart illustrating a data writing method according to the second exemplary embodiment of the present invention.

Referring to FIG. 15, in step S1501, the host interface unit 206 of the flash memory controller 104 receives a host write command and write-in data from the host system 1000 via the connector 102. Then, in step S1503, the memory management unit 204 identifies the written logical page addresses (i.e., the logical page addresses written by the host system 1000) corresponding to the host write command, and in step S1505, the memory management unit 204 identifies the opened physical blocks. Finally, in step S1507, the memory management unit 204 writes the write-in data into the physical page addresses of the flash memory chip 106 in unit of each logical page address group according to the written logical access addresses and the address centers and the address radiuses of the opened physical blocks.

Figure 16:
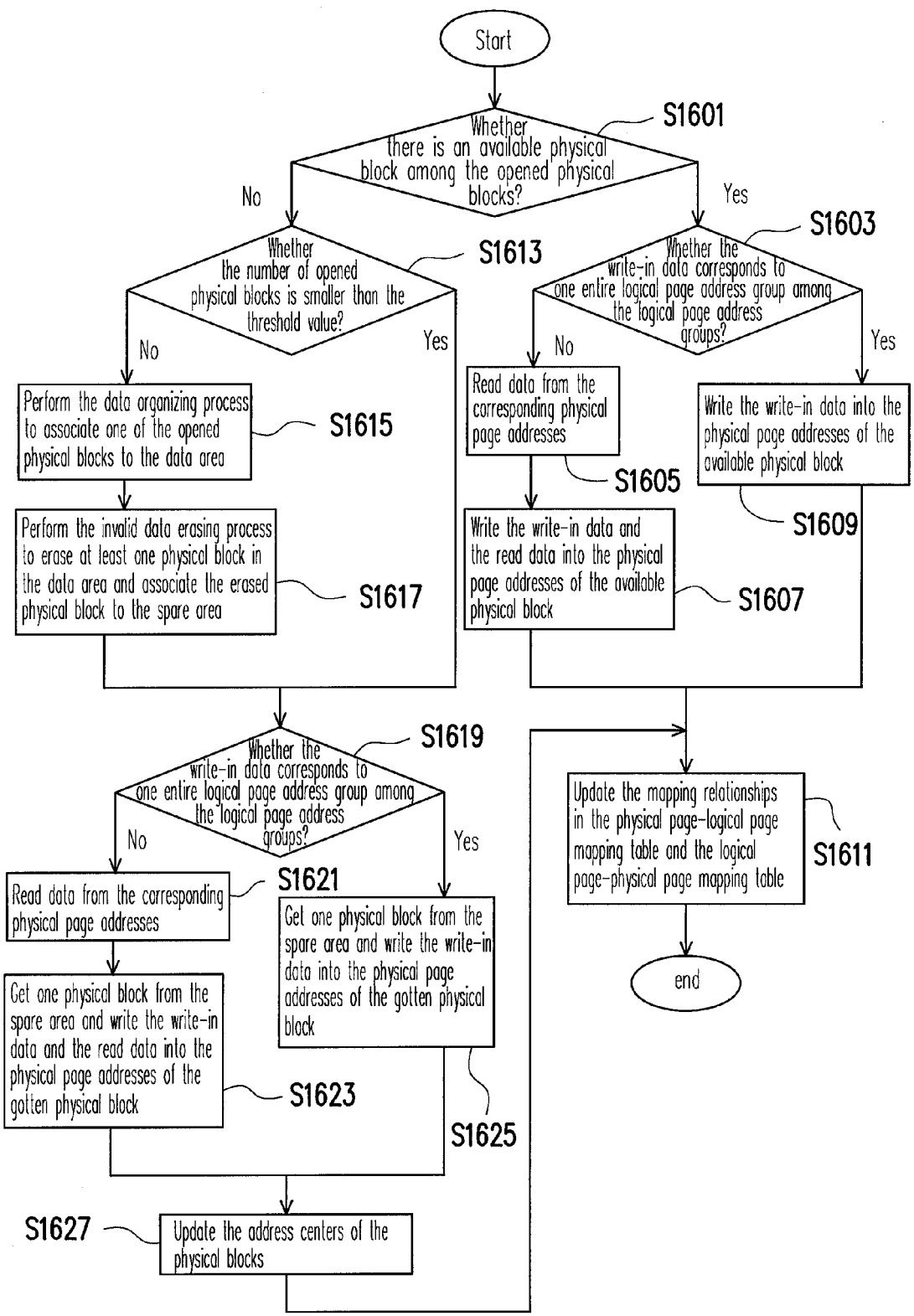
FIG. 16 is a flowchart illustrating detail steps of step S1507 shown in FIG. 15.

FIG. 16 is a flowchart illustrating detail steps of step S1507 shown in FIG. 15.

Referring to FIG. 16, in step S1601, the memory management unit 204 determines whether there is an available physical block among the opened physical blocks, wherein the address radius of the available physical block is larger than a distance between one of the written logical access addresses and the address center of the available physical block (i.e., the formula (1) must be satisfied).

If it is determined in step S1601 that there is the available physical block among the opened physical blocks, then in step S1603, the memory management unit 204 determines whether the write-in data corresponds to one entire logical page address group among the logical page address groups. If the write-in data does not correspond to one entire logical page address group among the logical page address groups, then in step S1605, the memory management unit 204 reads data from the corresponding physical page addresses, and in step S1607, the memory management unit 204 writes the write-in data and the read data into the physical page addresses of the available physical block.

If it is determined in step S1603 that the write-in data correspond to one entire logical page address group among the logical page address groups, then in step S1609, the memory management unit 204 writes the write-in data into the physical page addresses of the available physical block.

After that, in step S1611, the memory management unit 204 updates the mapping relationships in the physical page-logical page mapping table 420 and the logical page-physical page mapping table 410 (e.g., as shown in FIGS. 14A and 14B), and the process shown in FIG. 16 is terminated.

If it is determined in step S1601 that there is no any available physical block among the opened physical blocks, then in step S1613 the memory management unit 204 determines whether the number of opened physical blocks is smaller than the opened physical block threshold value.

If it is determined in step S1613 that the number of opened physical blocks is not smaller than the opened physical block threshold value, then in step S1615, the data organizing process is performed to associate one of the opened physical blocks to the data area 304a, and in step S1617, the invalid data erasing process is performed to erase at least one physical block in the data area 304a and associate the erased physical block to the spare area 304b.

After that, in step S1619, the memory management unit 204 determines whether the write-in data corresponds to one entire logical page address group among the logical page address groups. If the write-in data does not correspond to one entire logical page address group among the logical page address groups, then in step S1621, the memory management unit 204 reads data from the corresponding physical page addresses. After that, in step S1623, the memory management unit 204 gets one physical block from the spare area 304b and writes the write-in data and the read data into the physical page addresses of the gotten physical block.

If it is determined in step S1619 that the write-in data correspond to one entire logical page address group among the logical page address groups, then in step S1625, the memory management unit 204 gets one physical block from the spare area 304b and writes the write-in data into the physical page addresses of the gotten physical block.

After that, in step S1627, the memory management unit 204 updates the address centers of the physical blocks, and the step S1611 is executed.

As described above, the data writing method provided by the present invention selects suitable physical page addresses to write data by setting address centers and address radiuses for physical blocks and according to logical access addresses corresponding to data to be written by the host system and the address centers and the address radiuses of the physical blocks. Accordingly, data belonging continuous logical page addresses more centrally be stored in the same physical block, thereby the time for organizing valid data and invalid data in physical blocks is reduced and the speed of writing data into a flash memory is increased. The previously described exemplary embodiments of the present invention have the advantages aforementioned, wherein the advantages aforementioned not required in all versions of the invention.

Although the invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:

1. A data writing method, for writing data from a host system into a flash memory chip, wherein the flash memory chip includes a plurality of physical blocks, the data writing method comprising:
    configuring a plurality of logical access addresses;
    receiving write-in data from the host system, wherein at least one or more logical access addresses among the logical access addresses are written with the write-in data;
    determining whether there are at least one or more opened physical blocks;
    when there is no any opened physical block among the physical blocks, getting a physical block from the physical blocks, writing the write-in data into the gotten physical block and setting one of the written logical access addresses to be an address center of the gotten physical block;
    when there are at least one or more opened physical blocks among the physical blocks, determining whether there is at least one available physical block among the at least one or more opened physical blocks; and
    when there is the at least one available physical block among the at least one or more opened physical blocks, writing the write-in data into the at least one available physical block,
    wherein the address radius of the at least one available physical block is larger than a distance between one of the written logical access addresses and the address center of the at least one available physical block.

2. The data writing method according to claim 1 further comprises maintaining a physical block address center table to record the address center of the gotten physical block.

3. The data writing method according to claim 1 further comprises:
    when there is no any available physical block among the at least one or more opened physical blocks, determining whether the number of the at least one or more opened physical blocks is smaller than an opened physical block threshold value; and
    when the number of the at least one or more opened physical blocks is smaller than the opened physical block threshold value, getting a physical block from the physical blocks, writing the write-in data into the gotten physical block and setting one of the written logical access addresses to be the address center of the gotten physical block.

4. The data writing method according to claim 3, further comprising:
    when the number of the at least one or more opened physical blocks is not smaller than the opened physical block threshold value, performing a data organizing process to erase one of the physical blocks.

5. The data writing method according to claim 1, further comprising:
    grouping the logical access addresses into a plurality of logical page addresses; and
    grouping the logical page addresses into a plurality of logical page address groups.

6. The data writing method according to claim 5, wherein the step of writing the write-in data into the gotten physical block comprises:
    writing the write-in data into the flash memory chip in unit of one of the logical page address groups.

7. The data writing method according to claim 6, wherein the step of writing the write-in data into the flash memory chip in unit of one of the logical page address groups comprises:
    determining whether the written logical access addresses corresponding to the write-in data corresponds to one entire logical page address group among the logical page address groups;
    when the written logical access addresses corresponding to the write-in data corresponds to one entire logical page address group among the logical page address groups, writing the write-in data into the flash memory chip; and
    when the written logical access addresses corresponding to the write-in data does not correspond to one entire logical page address group among the logical page address groups, reading other data belonging to the logical page address group corresponding to the written logical access addresses, and writing the write-in data and the other data into the flash memory chip.

8. A flash memory controller, for writing data from a host system into a flash memory chip, wherein the flash memory chip includes a plurality of physical blocks, the flash memory controller comprising:
a microprocessor unit;
a flash memory interface unit, coupled to the microprocessor unit, and configured to coupe to the flash memory chip;
a host interface unit, coupled to the microprocessor unit, and configured to couple to the host system; and
a memory management unit, coupled to the microprocessor unit and configured to configure a plurality of logical access addresses,
wherein the host interface unit receives write-in data from the host system, wherein at least one or more logical access addresses among the logical access addresses are written with the write-in data;
wherein the memory management unit determines whether there are at least one or more opened physical blocks among the physical blocks,
wherein when there is no any opened physical block among the physical blocks, the memory management unit gets a physical block from the physical blocks, writes the write-in data into the gotten physical block and sets one of the written logical access addresses to be an address center of the gotten physical block,
wherein when there are at least one or more opened physical block among the physical blocks, the memory management unit determines whether there is at least one available physical block among the at least one or more opened physical blocks,
wherein when there is the at least one available physical block among the at least one or more opened physical blocks, the memory management unit writes the write-in data into the at least one available physical block,
wherein the address radius of the at least one available physical block is larger than a distance between one of the written logical access addresses and the address center of the at least one available physical block.

9. The flash memory controller according to claim 8, wherein the memory management unit maintains a physical block address center table to record the address center of the gotten physical block.

10. The flash memory controller according to claim 8, wherein when there is no any available physical block among the at least one or more opened physical blocks, the memory management unit determines whether the number of the at least one or more opened physical blocks is smaller than an opened physical block threshold value,
when the number of the at least one or more opened physical blocks is smaller than the opened physical block threshold value, the memory management unit gets a physical block from the physical blocks, writes the write-in data into the gotten physical block and sets one of the written logical access addresses to be the address center of the gotten physical block.

11. The flash memory controller according to claim 10, when the number of the at least one or more opened physical blocks is not smaller than the opened physical block threshold value, the memory management unit performs a data organizing process to erase one of the physical blocks.

12. The flash memory controller according to claim 8, wherein the memory management unit groups the logical access addresses into a plurality of logical page addresses and groups the logical page addresses into a plurality of logical page address groups.

13. The flash memory controller according to claim 12, wherein the memory management unit writes the write-in data into the flash memory chip in unit of one of the logical page address groups.

14. The flash memory controller according to claim 13, wherein the memory management unit determines whether the written logical access addresses corresponding to the write-in data corresponds to one entire logical page address group among the logical page address groups,
wherein when the written logical access addresses corresponding to the write-in data corresponds to one entire logical page address group among the logical page address groups, the memory management unit writes the write-in data into the flash memory chip,
when the written logical access addresses corresponding to the write-in data does not correspond to one entire logical page address group among the logical page address groups, the memory management unit reads other data belonging to the logical page address group corresponding to the written logical access addresses, and writes the write-in data and the other data into the flash memory chip.

15. A flash memory storage system, comprising:
a flash memory chip, having a plurality of physical blocks;
a connector, configured to couple to a host system; and
a flash memory controller, coupled to the flash memory chip and the connector and configured to configure a plurality of logical access addresses,
wherein the flash memory controller receives write-in data from the host system, wherein at least one or more logical access addresses among the logical access addresses are written with the write-in data,
wherein the flash memory controller determines whether there are at least one or more opened physical blocks among the physical blocks,
wherein when there is no any opened physical block among the physical blocks, the flash memory controller gets a physical block from the physical blocks, writes the write-in data into the gotten physical block and sets one of the written logical access addresses to be an address center of the gotten physical block,
wherein when there are at least one or more opened physical block among the physical blocks, the flash memory controller determines whether there is at least one available physical block among the at least one or more opened physical blocks,
wherein when there is the at least one available physical block among the at least one or more opened physical blocks, the flash memory controller writes the write-in data into the at least one available physical block,
wherein the address radius of the at least one available physical block is larger than a distance between one of the written logical access addresses and the address center of the at least one available physical block.

16. The flash memory storage system according to claim 15,
wherein the flash memory controller maintains a physical block address center table to record the address center of the gotten physical block.

17. The flash memory storage system according to claim 15, wherein when there is no any available physical block among the at least one or more opened physical blocks, the flash memory controller determines whether the number of the at least one or more opened physical blocks is smaller than an opened physical block threshold value, wherein when the number of the at least one or more opened physical blocks is smaller than the opened physical block threshold value, the flash memory controller gets a physical block from the physical blocks, writes the write-in data into the gotten physical block and sets one of the written logical access addresses to be the address center of the gotten physical block.

18. The flash memory storage system according to claim 17, wherein when the number of the at least one or more opened physical blocks is not smaller than the opened physical block threshold value, the flash memory controller performs a data organizing process to erase one of the physical blocks.

19. The flash memory storage system according to claim 15, wherein the flash memory controller groups the logical access addresses into a plurality of logical page addresses and groups the logical page addresses into a plurality of logical page address groups.

20. The flash memory storage system according to claim 19, wherein the flash memory controller writes the write-in data into the flash memory chip in unit of one of the logical page address groups.

21. The flash memory storage system according to claim 20, wherein the flash memory controller determines whether the written logical access addresses corresponding to the write-in data corresponds to one entire logical page address group among the logical page address groups, wherein when the written logical access addresses corresponding to the write-in data corresponds to one entire logical page address group among the logical page address groups, the flash memory controller writes the write-in data into the flash memory chip, wherein when the written logical access addresses corresponding to the write-in data does not correspond to one entire logical page address group among the logical page address groups, the flash memory controller reads other data belonging to the logical page address group corresponding to the written logical access addresses, and writes the write-in data and the other data into the flash memory chip.

* * * * *